US007979433B2

(12) United States Patent
Vora et al.

(10) Patent No.: US 7,979,433 B2
(45) Date of Patent: **\*Jul. 12, 2011**

(54) METHOD AND APPARATUS FOR IMPLEMENTING A CORPORATE DIRECTORY AND SERVICE CENTER

(75) Inventors: Kumar Vora, San Jose, CA (US);
Rajesh Raman, San Jose, CA (US);
Prakash Ramamurthy, Sunnyvale, CA (US); Praveen R. Swadi, Santa Clara, CA (US); Michael J. Shandony, Santa Clara, CA (US); Vrinda S. Joshi, Mountain View, CA (US); Shahram Moatazedi, Palo Alto, CA (US); Adam C. Stone, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 539 days.

This patent is subject to a terminal disclaimer.

(21) Appl. No.: 12/034,784

(22) Filed: Feb. 21, 2008

(65) Prior Publication Data

US 2008/0147657 A1 Jun. 19, 2008

Related U.S. Application Data

(63) Continuation of application No. 10/340,218, filed on Jan. 9, 2003, now Pat. No. 7,370,045, which is a continuation of application No. 09/379,564, filed on Aug. 23, 1999, now Pat. No. 6,539,379.

(51) Int. Cl.
*G06F 17/30* (2006.01)

(52) U.S. Cl. ........................................ 707/736; 707/802

(58) Field of Classification Search .................. 707/802, 707/736
See application file for complete search history.

(56) References Cited

U.S. PATENT DOCUMENTS

| | | |
|---|---|---|
| 5,077,666 A | 12/1991 | Brimm et al. |
| 5,455,953 A | 10/1995 | Russell |
| 5,530,861 A | 6/1996 | Diamant et al. |
| 5,581,691 A | 12/1996 | Hsu et al. |
| 5,655,118 A | 8/1997 | Heindel et al. |
| 5,671,360 A | 9/1997 | Hambrick et al. |
| 5,678,041 A | 10/1997 | Baker et al. |
| 5,692,125 A | 11/1997 | Schloss et al. |
| 5,708,780 A | 1/1998 | Levergood et al. |
| 5,764,890 A | 6/1998 | Glasser et al. |
| 5,812,769 A | 9/1998 | Graber et al. |
| 5,890,127 A | 3/1999 | Buzsaki |
| 5,943,652 A | 8/1999 | Sisley et al. |
| 5,944,824 A | 8/1999 | He |

(Continued)

OTHER PUBLICATIONS

U.S. Appl. No. 10/340,218, Office Action dated Jul. 27, 2006, 12 pages.

(Continued)

*Primary Examiner* — Cheryl Lewis
(74) *Attorney, Agent, or Firm* — Kilpatrick Townsend & Stockton LLP

(57) ABSTRACT

A method and apparatus for implementing a corporate directory and service center is described. The method includes and the apparatus performs querying for common characteristics, displaying information in a varied manner of displays and switching between the manners of displaying, maintaining data integrity and changing data, and defining types of data with forms of display or treatments for handling the data. The method may be embodied in various media as instructions which a machine may execute to perform the method.

54 Claims, 45 Drawing Sheets

U.S. PATENT DOCUMENTS

| | | | |
|---|---|---|---|
| 5,974,392 A | 10/1999 | Endo | |
| 5,991,810 A | 11/1999 | Shapiro et al. | |
| 5,999,911 A | 12/1999 | Berg et al. | |
| 6,049,776 A | 4/2000 | Donnelly et al. | |
| 6,049,812 A * | 4/2000 | Bertram et al. | 715/205 |
| 6,067,525 A | 5/2000 | Johnson et al. | |
| 6,073,109 A | 6/2000 | Flores et al. | |
| 6,098,056 A | 8/2000 | Rusnak et al. | |
| 6,101,481 A | 8/2000 | Miller | |
| 6,131,120 A | 10/2000 | Reid | |
| 6,138,104 A | 10/2000 | Marchak et al. | |
| 6,141,778 A | 10/2000 | Kane et al. | |
| 6,151,531 A | 11/2000 | Frankel et al. | |
| 6,154,738 A | 11/2000 | Call | |
| 6,157,953 A * | 12/2000 | Chang et al. | 709/225 |
| 6,158,010 A | 12/2000 | Moriconi et al. | |
| 6,161,139 A * | 12/2000 | Win et al. | 709/225 |
| 6,182,142 B1 * | 1/2001 | Win et al. | 709/229 |
| 6,189,003 B1 * | 2/2001 | Leal | 1/1 |
| 6,205,472 B1 * | 3/2001 | Gilmour | 709/206 |
| 6,208,986 B1 * | 3/2001 | Schneck et al. | 1/1 |
| 6,209,036 B1 * | 3/2001 | Aldred et al. | 709/229 |
| 6,212,558 B1 | 4/2001 | Antur et al. | |
| 6,253,202 B1 * | 6/2001 | Gilmour | 1/1 |
| 6,256,739 B1 | 7/2001 | Skopp et al. | |
| 6,266,420 B1 | 7/2001 | Langford et al. | |
| 6,269,361 B1 | 7/2001 | Davis et al. | |
| 6,275,809 B1 | 8/2001 | Tamaki et al. | |
| 6,275,812 B1 | 8/2001 | Haq et al. | |
| 6,308,163 B1 | 10/2001 | Du et al. | |
| 6,308,164 B1 | 10/2001 | Nummelin et al. | |
| 6,311,192 B1 | 10/2001 | Rosenthal et al. | |
| 6,321,133 B1 | 11/2001 | Smirnov et al. | |
| 6,338,097 B1 | 1/2002 | Krenzke et al. | |
| 6,347,312 B1 | 2/2002 | Byrne et al. | |
| 6,362,840 B1 | 3/2002 | Burg et al. | |
| 6,366,913 B1 | 4/2002 | Fitler, Jr. et al. | |
| 6,374,233 B1 | 4/2002 | Gardner | |
| 6,385,589 B1 | 5/2002 | Trusheim et al. | |
| 6,401,096 B1 | 6/2002 | Zellweger | |
| 6,415,259 B1 | 7/2002 | Wolfinger et al. | |
| 6,434,531 B1 | 8/2002 | Lancelot et al. | |
| 6,442,567 B1 | 8/2002 | Retallick et al. | |
| 6,446,043 B1 | 9/2002 | Matsumoto et al. | |
| 6,526,388 B1 | 2/2003 | Sakaguchi et al. | |
| 6,539,379 B1 | 3/2003 | Vora et al. | |
| 6,542,515 B1 | 4/2003 | Kumar et al. | |
| 6,564,370 B1 | 5/2003 | Hunt | |
| 6,708,187 B1 * | 3/2004 | Shanumgam et al. | 1/1 |
| 6,859,783 B2 * | 2/2005 | Cogger et al. | 705/10 |
| 2002/0032684 A1 | 3/2002 | Kobayashi et al. | |
| 2003/0145074 A1 | 7/2003 | Penick | |
| 2003/0191751 A1 | 10/2003 | Vora et al. | |

OTHER PUBLICATIONS

U.S. Appl. No. 10/340,218, Office Action dated Jun. 28, 2007, 5 pages.
U.S. Appl. No. 10/340,218, Notice of Allowance dated Jan. 9, 2008, 7 pages.
U.S. Appl. No. 10/340,218, Office Action dated Apr. 17, 2006, 7 pages.
U.S. Appl. No. 10/340,218, Office Action dated Jul. 26, 2005, 18 pages.
Walsh, Jeff, "Remedy Releases Three Applications For Help-Desk Suite," InfoWorld, vol. 19, Issue 16, p. 34, Apr. 21, 1997.
Cooney, Michael, "IBM Rolls Out Host- And Server-Based Mgmt. Apps," Network World, vol. 12, Issue 6, pp. 6-7, Feb. 6, 1995.
Leon, Mark, "McAfee's NetTools Promises To Ease Network Desktop Diagnosis," InfoWorld, vol. 17, Issue 30, p. 53, Jul. 24, 1995.
Musthaler, Linda, "The Trouble With Help Desk Selection," Network World, vol. 12, Issue 8, pp. 35-39, Feb. 20, 1995.
Netegrity Inc., "SiteMinder Agent Operations Guide," Version 4.0, pp. 1-174, 1997.
Netegrity Inc., "SiteMinder Deployment Guide," Version 4.0, pp. 1-314, 1997.
Netegrity Inc., "SiteMinder Developer's API Guide," Version 4.0, pp. 1-368, 1997.
Netegrity Inc., "SiteMinder Installation Guide," Version 4.0, pp. 1-280, 1997.
Netegrity Inc., "SiteMinder Policy Server Operations Guide," Version 4.0, pp. 1-556, 1997.
Schmersal, Frank, "Testing To Maintain Service Standards," Communications News, vol. 35, Issue 3, pp. 22-23, Mar. 1998.
Securant Technologies, Inc., "Clear Trust, Unified Access Management," pp. 1-23, 1997.
U.S. Appl. No. 09/379,564, Office Action dated Jan. 15, 2002, 18 pages.
U.S. Appl. No. 09/379,564, Office Action dated Jul. 31, 2002, 15 pages.
U.S. Appl. No. 10/340,218, Office Action dated Jan. 12, 2007, 10 pages.
U.S. Appl. No. 10/340,218, Office Action dated Jan. 26, 2006, 8 pages.
U.S. Appl. No. 10/340,218, Office Action dated Jul. 27, 2006, 12 pages.
U.S. Appl. No. 10/340,218, Office Action dated Jun. 28, 2007, 5 pages.
U.S. Appl. No. 10/340,218, Notice of Allowance dated Jan. 9, 2008, 7 pages.
U.S. Appl. No. 10/340,218, Office Action dated Apr. 17, 2006, 7 pages.
U.S. Appl. No. 10/340,218, Office Action dated Jul. 26, 2005, 18 pages.

* cited by examiner

110 — 
112 Name
114 Title
116 Phone
118 Email
120 Office
122 Fax
124 Cell
126 Pager
128 Web page
130 Manager
132 Assistant
134 Department
136 Direct Reports 142 SSN
144 Salary
146 Home Phone
148 Home Address 138 Building
140 Address Photo 110 

Joanne Young ← Name 112

*Administrator* ← Title 114

Personal Information

Personal Information

| | | |
|---|---|---|
| 112 | Name | Joanne Young |
| 118 | E-mail Address | J.Young@company.com |
| 116 | Phone Number | 408-555-1208 |
| 122 | Fax Number | 408-444-1002 |
| 124 | Mobile Phone Number | 650-835-8039 |
| 126 | Pager Number | 800-123-5775 |
| 127 | Pager Email Address | 8001235775@skytel.com |
| 150 | First Name | Joanne |
| 152 | Last Name | Young |

Location Information

Location Information

| | | |
|---|---|---|
| 156 | Floor Number | 5 |
| 138 | Building Number | 2 |
| 140 | Mailing Address | 650 Castro Street, Mountain Veiw, CA 94041 |
| 158 | Room Number | 2-507 |
| 160 | Mailstop | MS 2-5 |

Organizational Information

Organization Information

| | | |
|---|---|---|
| 130 | Manager | John Smith |
| 136 | Direct Report(s) | |
| 162 | Indirect Manager | |
| 132 | Admin. | |
| 164 | Organization | Corporate |
| 134 | Department Number | 1179 |
| 166 | Department URL | http://intranet.company.com/Departments/Corporate.html |

Projects & Skills Information

Projects and Skills

| | | |
|---|---|---|
| 168 | Skills | Corporate |
| 170 | Projects | |

FIG. 1B

Browse Results

Displaying 17 to 24 of 25 results for Name starting with "J"

| Name | E-Mail Address | Title | Phone Number | Organization |
|---|---|---|---|---|
| John Jackson | J.Jackson@company.com | VP of Sales | 408-555-1115 | Sales |
| John Kramer | J.Kramer@company.com | Account Manager | 415-555-5269 | Sales |
| John McCracken | J.McCracken@company.com | Manufacturing Engineer | 408-555-1183 | Manufacturing |
| John Smith | J.Smith@company.com | President & CEO | 408-555-1111 | Corporate |
| Jose Purvis | J.Purvis@company.com | Engineer | 408-555-1162 | Engineering |
| Joyce Dubovoy | J.Dubovoy@company.com | QA Engineer | 408-555-1168 | Engineering |
| John Schiller | J.Schiller@company.com | Manufacturing Engineer | 408-555-1186 | Manufacturing |
| Joyce Sprout | J.Sprout@company.com | Marketing Manager | 415-555-5264 | Marketing |

Customize

FIG. 5C

Create Report

| | | | | |
|---|---|---|---|---|
| LOOK IN | Admin ~132 | FOR | ☑ 👤 David Robinson [Select User] ~5250 ~5240 | ➕ |
| AND | Building Number ~138 | FOR | [ ] ~5280 | ➕ |
| AND | Department Number ~134 | FOR | [ ] | ➕ |
| AND | Department URL ~166 | FOR | corporate | ➕ |
| AND | E-Mail Address ~118 | FOR | [ ] | ➕ |
| AND | Fax Number ~122 | FOR | [ ] | ➕ |
| AND | First Name ~150 | FOR | [ ] | ➕ |
| AND | Floor Number ~156 | FOR | [ ] | ➕ |
| AND | Indirect Manager ~162 | FOR | [Select User] ~5240 | ➕ |
| AND | Last Name ~152 | FOR | [ ] | ➕ |
| AND | Mailing Address ~140 | FOR | [ ] | ➕ |
| AND | Mailstop ~160 | FOR | [ ] | ➕ |
| AND | Manager ~130 | FOR | [Select User] ~5240 | ➕ |
| AND | Mobile Phone Number | FOR | [ ] | ➕ |
| AND | Name ~112, 124 | FOR | [ ] | ➕ |
| AND | Organization ~164 | FOR | Corporate / Engineering / Manufacturing / Marketing / Sales | ➕ |
| AND | Pager Email Address ~127 | FOR | [ ] | ➕ |
| AND | Pager Number ~126 | FOR | [ ] | ➕ |
| AND | Phone Number ~116 | FOR | [ ] | ➕ |
| AND | Projects ~170 | FOR | [ ] | ➕ |
| AND | Room Number ~158 | FOR | [ ] | ➕ |
| AND | Skills ~168 | FOR | [ ] | ➕ |
| AND | Title ~190 | FOR | [ ] | ➕ |

[Less] ~5290
⊙ Display [8] results   ○ Display all the results

[Generate Report] ~5230

FIG. 5J

View Reports

5310

| Report Name | |
|---|---|
| 5322 → | 🖥 Engineering |
| 5324 → | 🖥 Building 1 |
| 5326 → | 🖥 Building 2 |
| 5328 → | 🖥 Company VPs |

5320

| Report Discription |
|---|
| All the employees in the Engineering organization. |
| Employees in Building 1 , 650 Castro Street. |
| Employees in Building 2 , 650 Castro Street. |
| All the Vice Presidents of the company. |

FIG. 5K

Engineering

Displaying 1 to 10 of 36 results

| Name | Title | Organization | E-Mail Address | Phone Number |
|---|---|---|---|---|
| Bill Kreutzman | Engineer | Engineering | B.Kreutzman@company.com | 408-555-1152 |
| Brooke Gates | Engineering Manager | Engineering | B.Gates@company.com | 408-555-1134 |
| Chris Avers | Engineer | Engineering | C.Avers@company.com | 408-555-1158 |
| Dale Wamaby | Administrator | Engineering | D.Wamaby@company.com | 408-555-1204 |
| David Farley | Training Associate | Engineering | D.Farley@company.com | 408-555-1172 |
| Diana Magee | Engineering Manager | Engineering | D.Magee@company.com | 408-555-1133 |
| Edward Dubrough | Q A Manager | Engineering | E.Dubrough@company.com | 415-555-5252 |
| Elliot Thornberg | Engineer | Engineering | E.Thornberg@company.com | 408-555-1160 |
| Frank Eisner | Training Associate | Engineering | F.Eisner@company.com | 408-555-1171 |
| Jason Davidson | Q A Engineer | Engineering | J.Davidson@company.com | 408-555-1167 |

FIG. 5L

Ticket Confirmation

Ticket for request type Change Value was successfully created.
Ticket ID is:  19990731T0052080
Request is to:
Change Value 408-555-1111 to 408-111-5555
　　　　　　　　6310　　　　　6330　　　　6350

Following people are authorized to approve your request:
 Gordan Smith 6390

Email notification for ticket 19990731T0052080 failed due to following error: Error while connecting to SMTP server: G.Smith@company.com... User Unknown 6380

6370

6410

Search Results

| Ticket ID | Type | Status | Create Date | Process Date |
|---|---|---|---|---|
| ⊞ 19990731T0052080 | Change Value | Pending | 7/31/1999 | |

6410 — Ticket ID
6310 — Change Value
6510 — Pending
6610 — 7/31/1999
6620 — Process Date

FIG. 6G

Ticket Information
Detailed information about ticket 19990731T0052080.
⎯ 6410

| | | |
|---|---|---|
| 6710 — Service : | Phone Number | |
| 6610 — Create Date : | 7/31/1999 | |
| 6360 — Due Date : | 8/3/1999 | |
| 6370 — Requester Comments : | necessary to avoid harassment | |
| 6720 — Employee Status : | Regular | |
| 6410 — Ticket ID : | 19990731T0052080 | |
| 6390 — Owner(s): |  Gordan Smith | |
| 6730 — Requested By : |  John Smith | |
| 6310 — Type : | Change Value | |
| 6510 — Status : | Pending | |
| 6740 — Requested For : |  John Smith | |
| 6330 — Original Value : | 408-555-1111 | |
| 6350 — Requested Value : | 408-111-5555 | |

6740 — Cancel Request   6750 — Back

Employee Profile

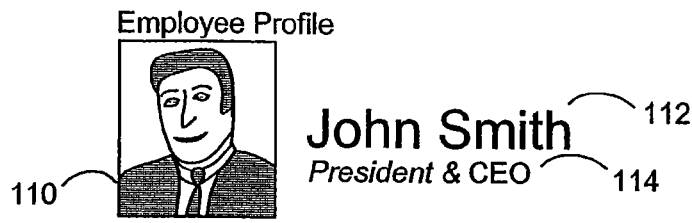

John Smith ~112
President & CEO ~114
110

Telephony Information

Telecommunications Information

| | | |
|---|---|---|
| 116 | Phone | 408-555-1111 |
| 122 | Fax | 408-444-1000 |
| 124 | Mobile | 650-435-3510 |
| 126 | Pager | 800-123-5678 |
| 118 | E-Mail | J.Smith@company.com |
| 127 | Pager Email Address | 8001235678@skytel.com |

Organizational Information

Organization Information

| | | |
|---|---|---|
| 164 | Organization | Corporate |
| 180 | Type | Full Time |
| 132 | Admin | ⬥ Joanna Young |
| 130 | Manager | |
| 136 | Direct Report(s) | ⬥ Jim Himes ⬥ Robert Hughes ⬥ John Jackson<br>⬥ Jane Paully ⬥ Alice Kristian ⬥ Lou Reed<br>⬥ Joanne Young |
| 162 | Indirect Manager | |
| 134 | Department Number | 1149 |
| 166 | Department URL | http://intranet.company.com/Departments/Corporate.html |
| 182 | Employee Grade Level | *Not Displayed* |
| 184 | Employee Number | *Not Displayed* |

Personal Information

Personal Information

| | | |
|---|---|---|
| 186 | Preferred Language | English |
| 187 | Home Page | http://intranet.company.com/People/J. smith |
| 148 | Home Mailing Address | *Not Displayed* |
| 146 | Home Phone | *Not Displayed* |
| 190 | Car License | *Not Displayed* |
| 191 | Description | CEO of the company |
| 168 | Projects | Currently looking into better IS infrastructure |
| 170 | Skills | Management, Marketing, Sales, Organization building |
| 192 | Start Date | *Not Displayed* |
| 193 | Credit Card Number | *Not Displayed* |
| 194 | Card Expiration Data | *Not Displayed* |
| 195 | Initials | JS |

Facilities Information

Facilities Information

FIG. 11A

METHOD AND APPARATUS FOR IMPLEMENTING A CORPORATE DIRECTORY AND SERVICE CENTER

CROSS REFERENCES TO RELATED APPLICATIONS

This application is a continuation application of and claims priority to U.S. patent application Ser. No. 10/340,218 now U.S. Pat. No. 7,370,045, filed Jan. 9, 2003 by Kumar Vora et al, and entitled "METHOD AND APPARATUS FOR IMPLEMENTING A CORPORATE DIRECTORY AND SERVICE CENTER", which is a continuation of and incorporates by reference U.S. patent application Ser. No. 09/379,564, filed Aug. 23, 1999, which issued as U.S. Pat. No. 6,539,379 on Mar. 25, 2003 TO Kumar Vora et al., for "METHOD AND APPARATUS FOR IMPLEMENTING A CORPORATE DIRECTORY AND SERVICE CENTER", both of which are incorporated herein by reference, in their entirety for all purposes.

BACKGROUND OF THE INVENTION

1. Field of the Invention

The present invention is generally related to the field of software. The present invention is more specifically related to the field of management of information.

2. Description of the Related Art

Organizational charts have long been used to represent the relationships between people in an organization, such as a corporate entity or societal group. As technology has progressed, databases have been maintained with the information associated with organizational charts as part of the databases. Such databases have the advantages of not having a physical limit to the information stored therein, as long as the supporting technology can contain the database. As a result, databases may be used to store not just the names and relationships of people in an organization, but may also include much richer information about each member of an organization.

Furthermore, databases may be implemented to also store information about physical assets and other items an organization monitors. Databases may contain information on buildings used by an organization, phone numbers within an organization, locations of assets such as computers within an organization, and many other attributes. Note, for instance, that location of an asset may include its physical location, as well as its logical location within the control of a suborganization (such as a marketing or engineering department) within an organization.

One relatively recently available method for storage of information is use of a directory server and a lightweight directory access protocol (LDAP). A directory server stores data entries in name-value or attribute-value pairs. Utilizing LDAP, queries can be made of the directory server, thereby locating a set of data entries which match the query. As a result, the information often stored in databases may be stored in a medium accessible to a directory server, and queries may be used to access this information. However, the directory server does not feature the strong typing capabilities that databases do. As an example, a data entry intended to be a telephone number, named 'phone' and intended to store only numeric values, will store the value "four-one-five" just as easily as it will store "415" in a directory server. Likewise, a database may allow a restriction on the size of a field of characters, whereas the directory server may store the data as a string of ASCII characters, but not limit the length of the string.

SUMMARY OF THE INVENTION

A method and apparatus for implementing a service center is described. This includes a method of searching a plurality of data entries, each data entry having a plurality of attributes, comprising: providing a common characteristic; searching the plurality of data entries for the common characteristic; and organizing the data entries which have the common characteristic of the plurality of data entries.

This also includes a method of determining a set of options given a defined characteristic comprising: searching a plurality of data entries for each data entry having the defined characteristic; generating a set of data entries from the searching, the set of data entries comprising each data entry having the defined characteristic, the set of data entries being a subset of the plurality of data entries; and organizing the set of data entries.

This further includes a method of providing information comprising: obtaining a data entry from a directory server, the data entry having a plurality of data items; and displaying the data entry in a human readable form by displaying a subset of the plurality of data items.

This additionally includes a method of maintaining a database of a plurality of data entries, each data entry having a unique identifier, comprising: changing the unique identifier for a first entry of the plurality of data entries, thereby creating a changed unique identifier for the first entry; searching the plurality of data entries for a subset of data entries, each data entry of the subset of data entries having a reference to the first entry; and updating the reference to the first entry of each data entry of the subset of data entries to reflect the changed unique identifier of the first entry.

Moreover, this includes a method of processing changes to a plurality of data entries comprising: receiving a first request for a change in a data entry of the plurality of data entries; automatically generating a predefined set of corresponding requests, the corresponding requests defined as prerequisites to completing the change for which the first request was received; maintaining status indicating whether the requests of the set of corresponding requests have been completed or denied; and generating a result, the result being either denial of the first request for the change or completion of the first request for the change, completion of the first request for the change including modification of the data entry of the plurality of data entries.

Additionally, this includes a method of displaying a data entry on a display comprising: displaying the data entry in a first manner of display; receiving a first triggering event, the first triggering event corresponding to a second manner of display; and displaying the data entry in the second manner of display in response to the first triggering event.

Moreover, this includes a method of accessing a set of data entries, each data entry comprising a set of data items, comprising: providing a set of semantic types of data items, each semantic type having a name and a treatment; recognizing a data item of a data entry of the set of data entries as having a first semantic type of the set of semantic types; and handling the data item of the data entry of the set of data entries according to the treatment of the first semantic type.

Additionally, this includes a method of controlling access to a set of data entries comprising: restricting access to a first subset of the set of data entries; restricting modification requests to a second subset of the set of data entries; and restricting modification to a third subset of the set of data entries.

Moreover, this includes a method of implementing access control to a set of data entries comprising: setting a first access control regime for a first organization, an access control regime being a set of restrictions; setting a second access control regime for a second organization; and arbitrating between the first access control regime and the second access control regime for a person, the person being a member of the first organization and a member of the second organization.

This also includes apparatus suitable for performing such functions and media embodying instructions suitable for causing a machine to perform such methods.

BRIEF DESCRIPTION OF THE DRAWINGS

The present invention is illustrated by way of example and not limitation in the accompanying figures.

FIGS. 1B, 1C, and 1D illustrate alternate embodiments of a display of some of the information associated with an exemplary employee.

FIGS. 5C, 5D, 5E, 5F, 5G, 5H, 5J, 5K and 5L illustrate stages in the creation and use of queries and reports in one embodiment.

FIGS. 6B, 6C, 6D, 6E, 6F, 6G, 6H, and 6J illustrate stages in a process of requesting a change and the corresponding tickets in one embodiment.

FIGS. 11A, 11B, and 11C illustrate alternate views of a data entry based on controlled access to that data entry.

DETAILED DESCRIPTION

A method and apparatus for implementing a service center is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention is primarily described with reference to implementation in conjunction with a communications protocol commonly referred to as LDAP (lightweight directory access protocol) and a directory server. However, it will be apparent that the present invention may be practiced with other protocols and methods for storage of and access to information. Furthermore, the present invention is primarily described with reference to servicing (storing, accessing, and maintaining) data representing the structure of a company or organization. It will be apparent that data representing any type of structure or organization could be serviced utilizing the present invention.

Figure 1A:
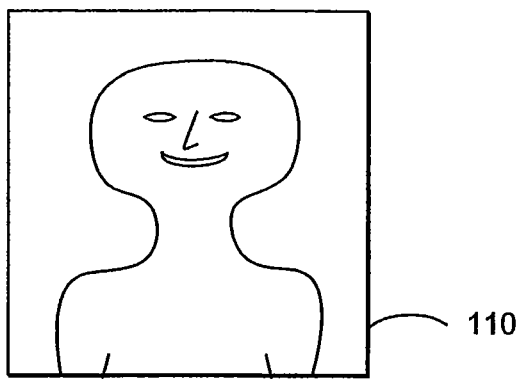
FIG. 1A illustrates some of the information associated with an exemplary employee as it might be stored in a database such as a directory server.

Turning to FIG. 1A, some of the information associated with an exemplary employee as it may be stored in a database such as a directory server is illustrated. The information is stored in a data entry, with a unique identifier by which the data entry may be accessed. This unique identifier may also be referred to as a distinguished name or dn. In one embodiment, this identifier includes the name of the employee, and the organization in which the employee works. The information actually stored may include data items such as a picture 110 (such as a JPEG file, for example), a Name 112, Title 114, Phone Number 116, Email Address 118, Office location 120, Fax number 122, Cell phone number 124, Pager number 126, Webpage address 128, Manager name 130, Assistant 132, Department 134, Building 138, Address 140 (or mail stop for example), SSN 142 (Social Security Number), Salary 144, Home Phone number 146, and Home Address 148. Note that each employee might not have information stored for each item listed above, and other items may be added to the data entry. Also, each data item may have its own format, such that the data stored in Phone number 116, Fax number 122 and Cell phone number 124 are all alphanumeric, whereas the information stored in a data items such as Name 112 is alphabetic only. Direct Reports 136 represent a special case, in that in one embodiment Direct Reports 136 is not actually stored in the data entry, but is derived from other data entries that make reference to the data entry in question. In an alternative embodiment, the value of Direct Reports 136 may be stored in the data entry, either as unique identifiers referring to the direct reports, or as names of the direct reports, for example.

Furthermore, the information stored in data items may be references to other entries in the directory server. For example, Manager 130 may store a reference to the data entry for the person who manages the person represented by the instant data entry. Likewise, Assistant 132 may store a reference to the data entry for the assistant to the person represented by the instant data entry, or may store an indication that the person represented by the instant data entry has no assistant. In the case of a person not having an assistant, the data entry in a directory server may not contain any mention of an assistant at all. For the person having an assistant, that person's data entry may contain an attribute 'Assistant' having a value that represents the data entry for that person's assistant (a corresponding unique identifier for example). For the person having no assistant, that person's data entry may simply not contain any attribute 'Assistant' and therefore no corresponding value.

Note that for display purposes, not all of the information stored in a data entry corresponding to a person might be visible. For instance, a peer of that person might only see those items in the left-hand column of FIG. 1. However, a person in the Human Resources Department may have access to all of the information in the data entry. Control of access to information will be discussed in more detail later.

Because of the inherent flexibility of the directory server, programs or systems managing the data accessible by the directory server must maintain control over the integrity of the information stored, to the extent that information of the proper type or format is stored in the value of each attribute-value pair. However, the directory server may be relied upon to maintain data integrity in the sense that if the proper unique identifier for a data entry is used, that data entry may be found and all of its data retrieved by the directory server much as file systems such as DOS and UNIX do. In one embodiment, the directory server stores data entries in a directory tree, and the unique identifier for each data entry specifies the path through this tree which will lead to the data entry. It will be appreciated that alternate schemes for storage of data entries and corresponding unique identifiers may be utilized.

FIG. 1B illustrates an alternative embodiment of a display of information associated with the exemplary employee, as viewed by another employee such as a peer of the exemplary employee. In this case, the Name 112 of the employee is 'Joanne Young' and that is further broken down into First Name 150 and Last Name 152. The Email Address 118 is displayed, in other embodiments, multiple email addresses may be displayed, either as numbered addresses, or as a preferred email address and alternate email addresses. Likewise, Phone Number 116 and Fax Number 122 are displayed, along with Mobile Phone Number (Cell) 124 and Pager Number 126. Additionally, Pager Email Address 127 is made available.

For the convenience of the viewer, location information is further broken down into Floor Number 156, Building Number 138, Mailing Address 140, Room Number 158 and Mailstop (or internal mailing address) 160. Moreover, organizational information is provided in the form of Manager 130, Direct Report(s) 136, Indirect Manager 162, Admin (Assistant) 132, Organization 164, Department Number 134, and Department URL 166. Also, Skills 168 and Projects 170 are provided, thereby giving some indication of the availability of the employee and possible match to the needs of a viewer seeking help on a project. Note that the Manager 130 and Indirect Manager 162 fields provide flexibility for such occurrences as temporary appointments or special assignments and shared resources. Presumably, a manager looking for the services of an employee would have the option of contacting one or the other manager.

Likewise, note that the Manager 130, Indirect Manager 162, and Admin 132 items all contain references to data entries corresponding to the people in those roles in one embodiment, and the displayed information comes from the corresponding data entries. Thus, when a change occurs in the organization, the reference to the data entry may be changed, rather than requiring that each actual name be changed. Furthermore, in one embodiment, the Organization 164, Department Number 134, Department URL 166, Building Number 138, Mailing Address 140 contain references to data entries corresponding to the relevant entity (organization or department for example) or object (URL or Building for example), thereby further enhancing the flexibility of the data.

It will be apparent that not all of the data for a data entry need be displayed. For instance, SSN 142, Salary 144, Home Phone 146 and Home Address 148 are not displayed in this Figure. This may be due to lack of authorization to access this information on the part of the viewer, customization of the display resulting in exclusion of this information, lack of existence of the information in the corresponding data entry, or for other reasons. In particular, no information is displayed for Indirect Manager 162 or Admin 132 in this instance because no reference to either an Admin or Indirect Manager exists in the corresponding data entry. Likewise, because no employees report to this exemplary employee, no Direct Report(s) 136 are displayed.

Additionally, the Admin 132, Indirect Manager 162, and Manager 130 attributes are configured as semantic types, which means they are recognized as a semantic type and are handled in a manner prescribed by a treatment corresponding to the semantic type. In this example, the values of these attributes (if any) are references to other data entries, and selecting these values causes the display to shift to information from that data entry. Other examples of semantic types may, in one embodiment, include Phone 116 which would be handled by invoking an auto-dialer when Phone 116 is selected, Email 118 which would be handled by opening a window or otherwise allowing a user to send email to the address which is the value of Email 118, or Webpage 128 which would be handled by displaying the information accessible by the Universal Resource Locator which is the value of Webpage 128.

Finally, Locate button 172 and Add to Address Book button 174 are displayed, allowing for graphic location of the displayed employee as described below or addition of the displayed employee's information to an electronically maintained address book. Note that addition of the information to the address book may be done by copying the relevant information stored in the data entry into the address book. Alternatively, addition of the information to the address book may be accomplished by creating a reference to the displayed employee's data entry in the address book. Note that in one embodiment, the software that accesses and displays the information just described runs in conjunction with Netscape Navigator™ and the address book that is updated is the address book maintained by the Netscape Navigator™ software.

Attributes discussed so far have been treated as if all the attributes discussed (with the exception of Direct Reports) tend to be present in all data entries. However, in one embodiment, some attributes are required to be present in a data entry, some are optionally present, and some are derived from other contents of the data entry at hand or other data entries. Required attributes may include those attributes embodied in the unique identifier, or those attributes deemed essential to a valid entry by the managers of the directory server system. Optional attributes may include those attributes which only some of the data entries may be expected to have, or those attributes deemed non-essential by the managers of the directory server. Derived attributes are those which may be determined by such methods as combining other attributes, searching other data entries for references to a given data entry, or otherwise determined from the information accessible by the directory server. An excellent example of a derived attribute in one embodiment is the Direct Reports 136 attribute of FIG. 1B which is derived by a search through the information accessible by the directory server for all data entries that have a Manager attribute with a value equal to the unique identifier of the data entry in question. Thus, Direct Reports 136 is not stored in the data entry, but is determined at the time the data entry is displayed or accessed.

Figure 1C:
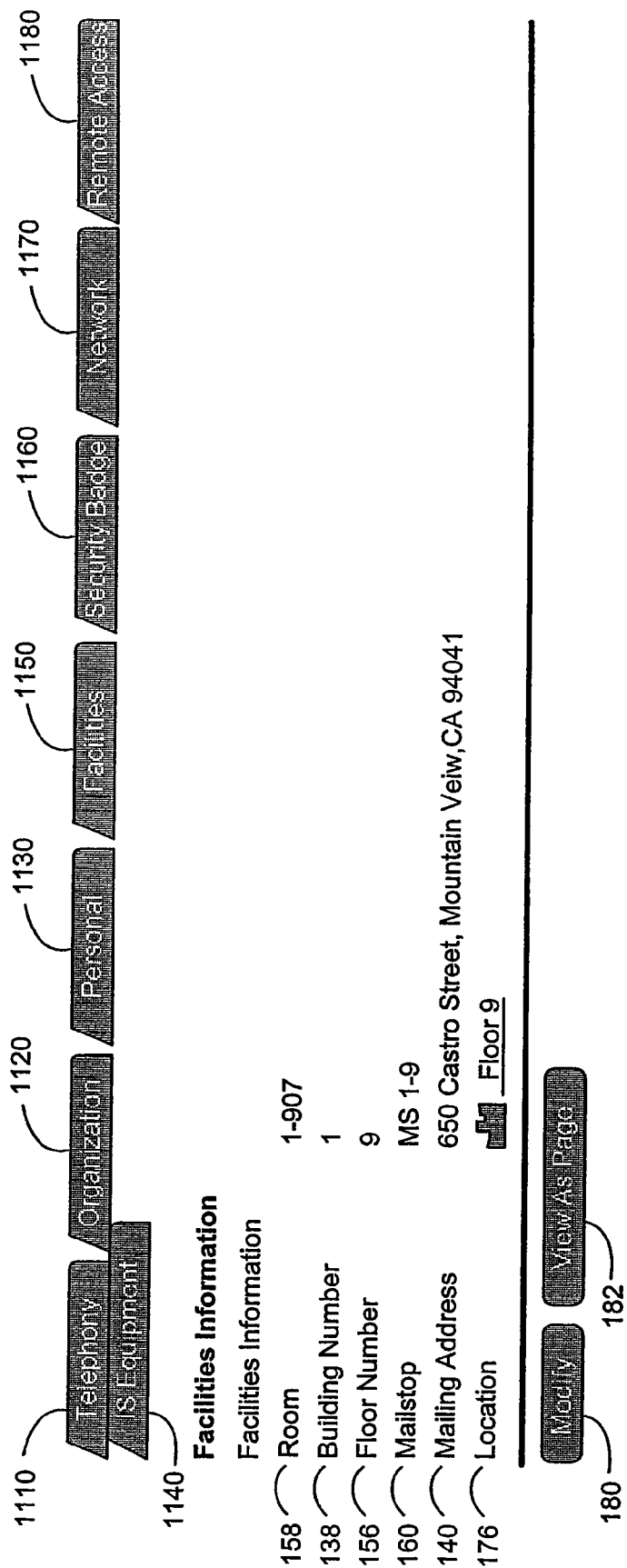

Turning to FIG. 1C, another alternate embodiment of a display of an exemplary employee's data entry is illustrated. This display has a group of tabs at the top, Telephony 1110, Organization 1120, Personal 1130, IS Equipment 1140, Facilities 1150, Security Badge 1160, Network 1170, and Remote Access 1180. The information actually displayed depends on which tab is selected by the viewer or user, along with whether the user in question has authority to access that information.

In the case of the exemplary employee displayed in this embodiment, information is displayed corresponding to the Facilities 1150 tab. This information, in one embodiment, includes Room 158, Building Number 138, Floor Number 156, Mailstop 160, Mailing Address 140, and Location 176. Additionally, Modify button 180 (which will be explained further below) and View as Page button 182 are included. View as Page button 182, in one embodiment, changes the display of the information in FIG. 1C to appear in a format similar to that of FIG. 1B, thereby displaying more information at one time.

Figure 1D:
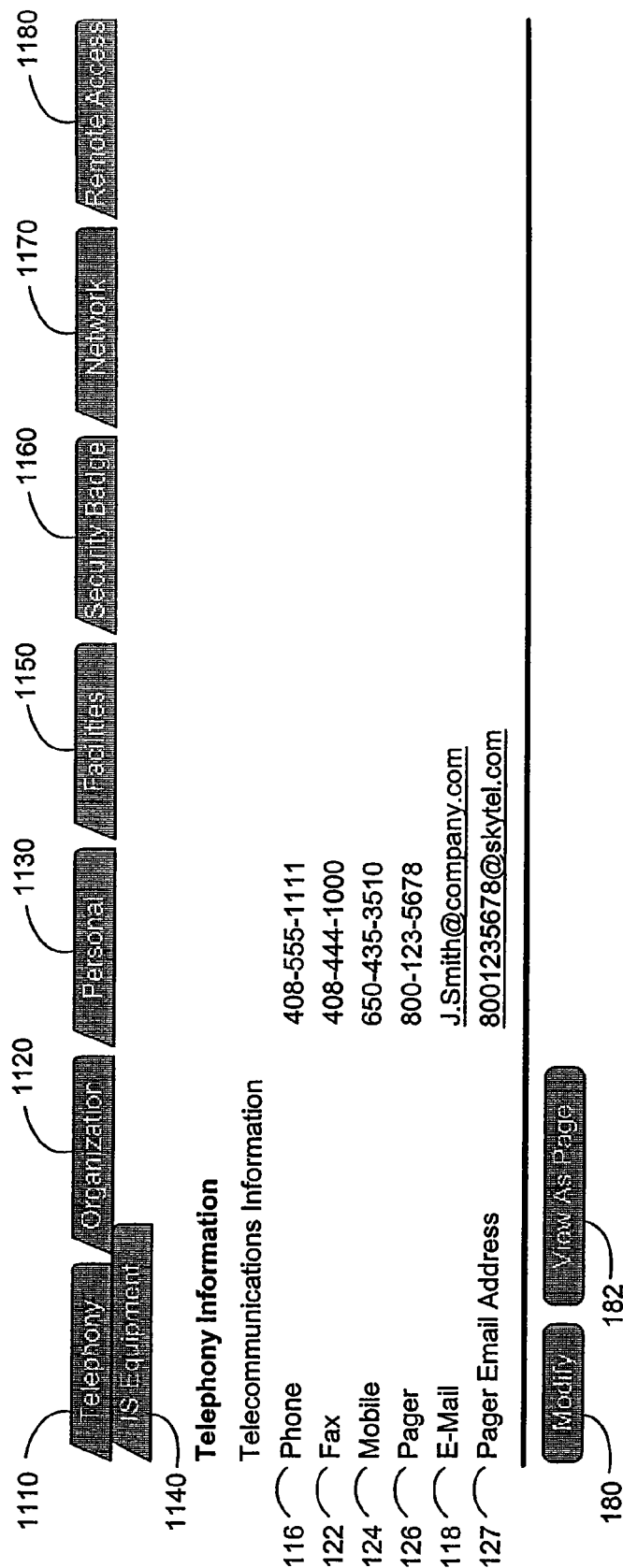

Turning to FIG. 1D, more information from the embodiment described in FIG. 1C is displayed. In this figure, telephony information including Phone 116, Fax 122, Mobile 124, Pager 126, Email 118 and Pager Email Address 127 are all displayed.

By selecting the Telephony 1110 tab, the users triggers the display of different information. Such selection may occur by positioning a cursor associated with the display over the tab, by executing keystrokes appropriate to the tab, or in other ways, and produces a triggering event which a program may use as a cue to change the display. In the current embodiment, this results in display of a different set of fields associated with the data entry displayed in FIG. 1C. Alternatively, the display in FIG. 1C may be termed a first manner of display, in this case displaying facilities information for example, the display in FIG. 1D may be termed a second manner of display, and a third manner of display may correspond to another tab, such as the Personal 1130 tab for example. In an alternative embodiment, selecting tabs may lead to displaying the same data in different corresponding formats, or it may lead to execution of associated programs, or other effects to be detailed below.

Figure 2:
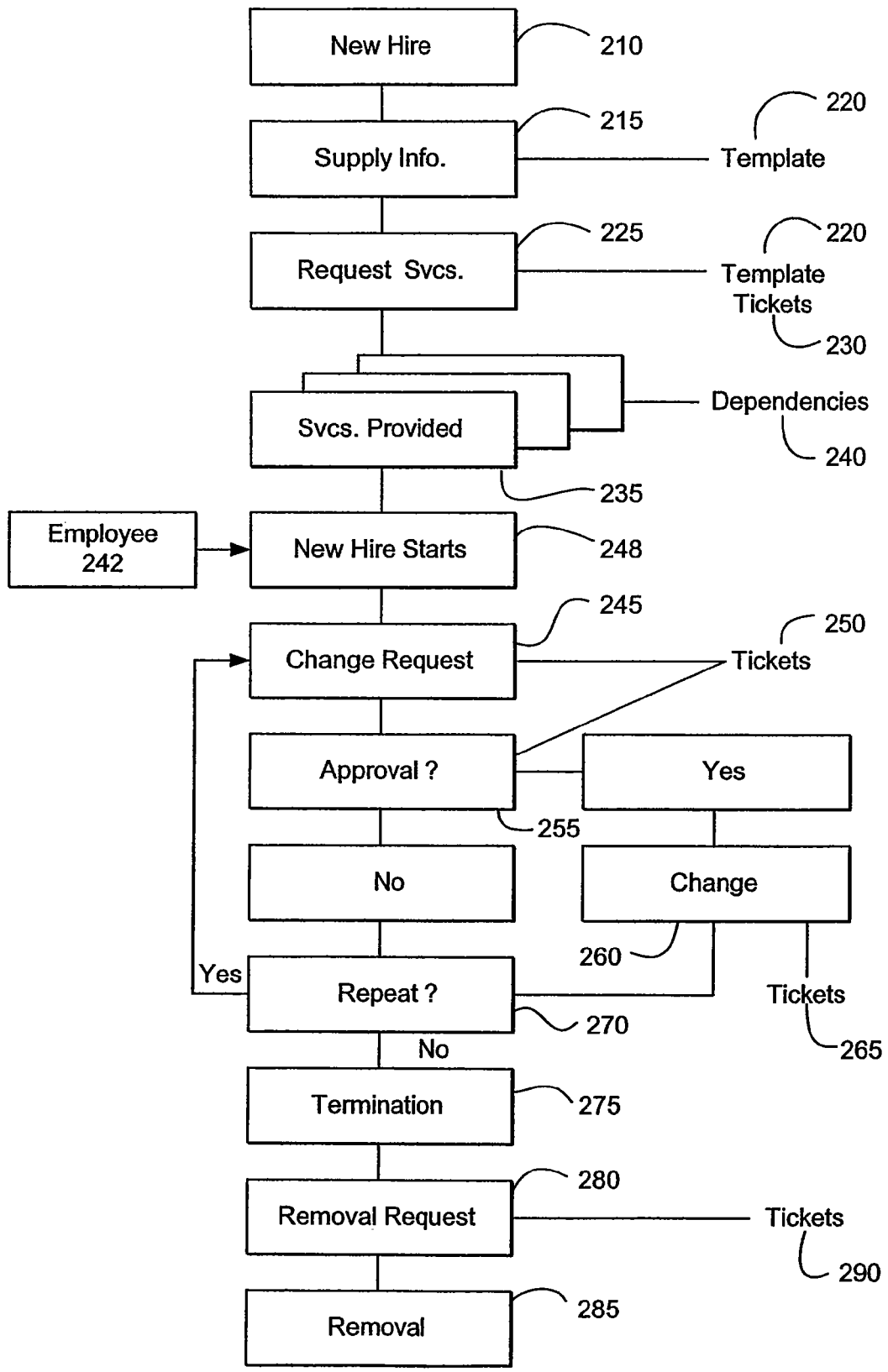
FIG. 2 illustrates what may happen to an exemplary employee during the employee's association with a company.

Turning to FIG. 2, what may happen to an exemplary employee during the employee's association with a company is illustrated. Note that this illustration exemplifies a process which may similarly be implemented for a member of an organization such as a club, or a customer of a company such as a subscriber to a magazine, for example. Initially, the employee is a New Hire 210, with no connection to the company. Information is supplied to create a data entry associated with the New Hire 210 at Supply Info 215. This process involves use of a Template 220 which may indicate both what type of information is needed, and what tasks need to be accomplished to integrate the New Hire 210 into the company. Further discussion of templates such as Template 220 may be found below. The information needed may include a name, home address, social security number, and other personal information, as well as information pertinent to the New Hire 210 in relation to the company, such as a job title, manager, and salary for example. The tasks which need to be accomplished may include allocating office space in a building, connecting a phone line and acquiring or issuing a phone, preparing an email address, providing a computer, locating a fax number for shared usage and other similar tasks. At Supply Info 215, in one embodiment, the data entry associated with New Hire 210 is created, and is held in a new employees group which is not accessible by others in the company, except for users with authorization including hiring personnel, such as managers or human resources employees, and system administrators.

Having determined, through use of the Template 220, or otherwise (such as specification or selection by the user), what tasks need to be accomplished, requests for the performance of these tasks are initiated at Request Services 225. In one embodiment, each request for performance of a task or change in information in the data entry related to New Hire 210 is represented by a Ticket 230. In one embodiment, each Ticket 230 is embodied in a data entry indicating what task needs to be accomplished and who owns the Ticket 230, the owner being the person who needs to accomplish the task. The creation of Ticket 230 results in notification to the owner that the task needs to be done, and the Ticket 230 is placed in a group of pending Tickets 230 which are awaiting completion. In one embodiment, pending tickets such as Tickets 230 are held in a service queue of tickets for each person responsible for the ticket, such as the owner or processor of the ticket, the person who is expected to act upon the ticket.

Upon completion of the tasks associated with Tickets 230 at Services Provided 235, the necessary changes in the data entry for New Hire 210 have been made, and likewise any physical preparations have been made such that New Hire 210 may start working within the organization. Note that Services Provided 235 may account for Dependencies 240. Dependencies 240 may include such requirements as performance of allocation of an office prior to connection of a telephone line because the telephone line may not be connected until a physical location for such a line has been provided. As a result, in one embodiment, a first Ticket 230 may depend on a second Ticket 230, such that the first Ticket 230 (such as phone installation) may not be completed until the second Ticket 230 (such as identifying an office) is completed. It will be apparent that multiple dependencies in serial, parallel, and series-parallel or parallel-series form may occur, and be represented logically by dependencies within a group of Tickets 230. Likewise, in an alternate embodiment, tickets may not include dependencies and/or may not be transferred.

After appropriate services are provided at Services Provided 235, and possibly in parallel with provision of some services, New Hire 210 starts work at Activation 248, and the data entry associated with New Hire 210 is placed in a group where it is accessible to everyone in the company. At this point, New Hire 210 effectively becomes Employee 242. While associated with the company, the Employee 242 may request changes, such as Change Request 245. Such a Change Request 245 may include requesting a cell phone, or it may include requesting a transfer to another office for example. In one embodiment, a Change Request 245 causes a Ticket 250 (similar to Ticket 230, but associated with a different action) to be generated, the owner of which would be the person or persons who may approve or deny the requested change. If the request is denied, no further action is taken on the request in question.

If the request is approved, Change 260 occurs, in which one or more Tickets 265 (associated with the actual change) may be generated, the owners of which are the people responsible for actually implementing the change. In the case of a request for a cell phone, a Ticket 265 may embody purchase of a cell phone and service contract, and another Ticket 265 may embody updating the data entry of Employee 242 to reflect the cell phone's existence and association with Employee 242. Additionally, the cell phone may have its own data entry accessible by the directory server, such that the organization may track who it is associated with, how its associated bills should be allocated to various budgets, and whether it has undergone maintenance. Alternatively, a single Ticket 265 may embody both the request function of Ticket 265 and the approval function of Ticket 250, thereby eliminating the need for Ticket 250.

In the case of a transfer of offices, a first Ticket 265 may be generated to accomplish preparing the new office for Employee 242. A second Ticket 265 may be generated to accomplish moving Employee 242's materials and equipment to the new office, and the second Ticket 265 may be dependent on completion of the first Ticket 265. A third Ticket 265 may be generated to accomplish updating the information in the directory server for the data entry for Employee 242 to reflect the new location of Employee 242's office. Such a third Ticket 265 may also be suitable for updating other data entries accessible by the directory server which represent which offices within a given building are available, or where equipment such as that used by Employee 242 is located.

Following the successful completion of the requested change, Request 270 occurs, in which the next request is processed by returning to Change Request 245. At some time, no more requests occur and the time (such as retirement) comes for Employee 242 to leave the company. At that time, Termination 275 occurs. A consequence of Termination 275 is Deactivation 277 which involves Tickets 290. Tickets 290 may, in one embodiment, embody the changes necessary to accomplish Removal Request 280, and may include a ticket to move the data entry associated with Employee 242 to a terminated employees group, a ticket to disconnect Employee 242's access to the company computers and voicemail, a ticket to remove Employee 242's email access. In one embodiment, moving the data entry associated with Employee 242 removes Employee 242 from accessibility by others in the company, while in another embodiment, a separate ticket to accomplish such a task must be issued, and that ticket might involve creating an accessible record indicating that New Hire 210 is not with the company. Note, the move of Employee 242's data entry may be accomplished logically, with no movement of data, or by adding an attribute such as 'Inactive' with a value of 'true' for example. It will be appreciated that a variety of changes to Employee 242's data entry will accomplish the same result. Upon completion of the actions associated with Tickets 290, Removal 285 has occurred and Employee 242 is no longer with the company.

Figure 3A:
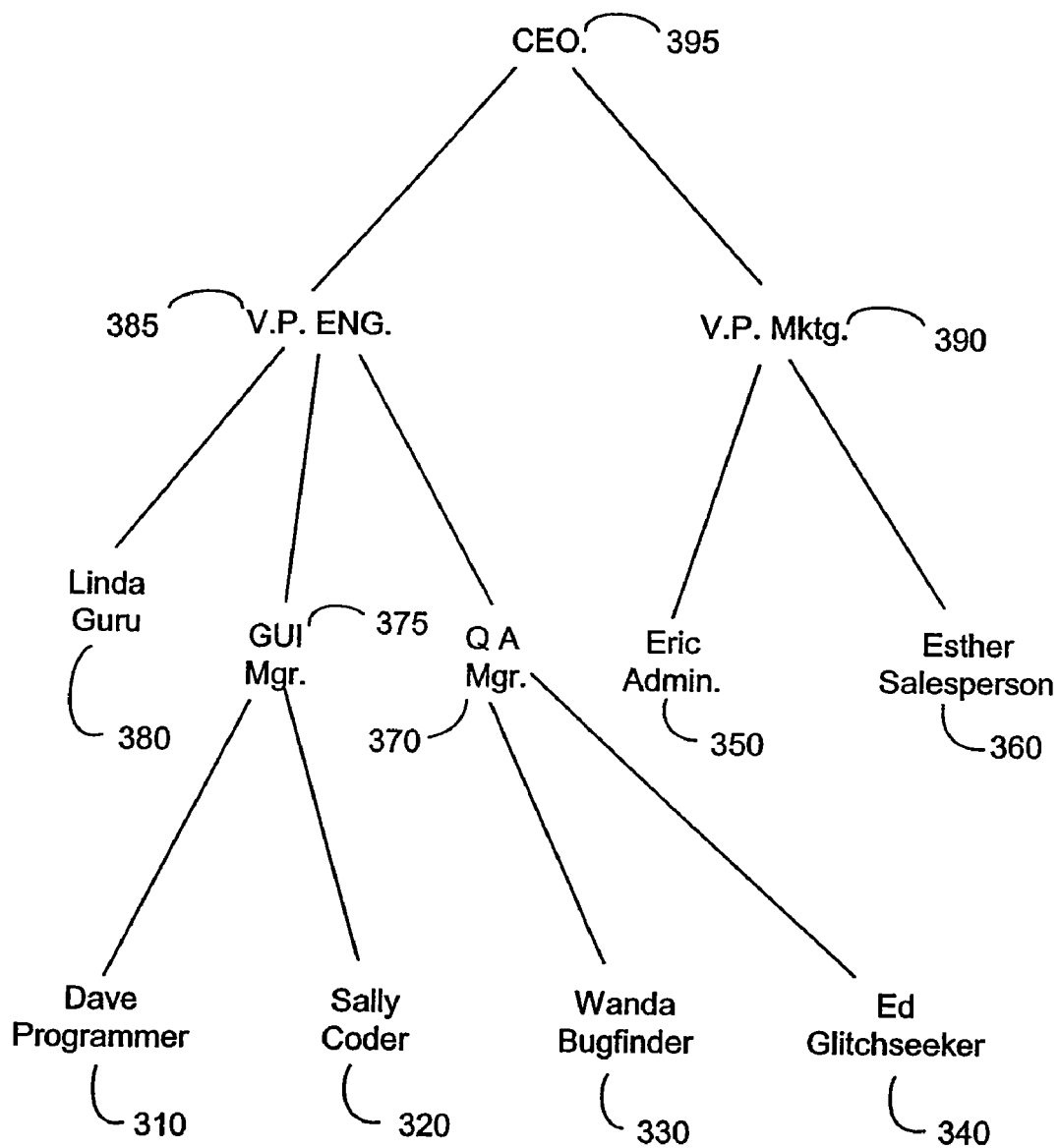
FIG. 3A illustrates an exemplary organizational chart for a company.

Turning to FIG. 3A, an exemplary organizational chart for a company is illustrated. Esther Salesperson 360 and Eric Adman 350 report to VP of Marketing 390, who reports to CEO 395. Wanda Bugfinder 330 and Ed Glitchseeker 340 report to Quality Assurance Manager 370. Dave Programmer 310 and Sally Coder 320 report to GUI Manager 375. Linda Guru 380, GUI Manager 375 and Quality Assurance Manager 370 all report to VP of Engineering 385, who reports to CEO 395.

Using the data entry described with respect to FIG. 1, with Linda Guru 380 as the person represented by the data entry, the data item for Manager would include a reference to VP of Engineering 385. However, if Linda Guru 380 requested a transfer to Marketing, a ticket may be generated which may be approved by anyone with authority to approve the transfer. Alternatively, in one embodiment, a ticket would be generated to obtain the approval of the move from both VP of Engineering 385 and VP of Marketing 390. Upon approval of the requested transfer, another ticket may be generated to cause an update of the information stored in the directory, including changing Linda Guru 380's department to Marketing, and Manager to VP of Marketing 390.

Furthermore, if the unique identifier associated with Linda Guru 380's data entry included her department, the unique identifier would be updated, and all references to Linda Guru 380 within the data accessible by the directory server would have to be updated with the new unique identifier. To perform such an update, each reference to Linda Guru 380 would have to be found within the data accessible by the directory server. This may be done by querying the directory server for any reference to Linda Guru 380, then updating each data entry that is found to have such a reference. Note that such a query would contain some indication of where to search, such as which attributes in the data entries may be expected to include a reference to Linda Guru 380.

Reference was made to Direct Reports in FIG. 1. Such a field, in one embodiment, would show which employees report directly to a person represented by a data entry. However, actually storing references to each employee reporting to a person can become cumbersome and unwieldy, and requires updating each time a transfer occurs. Another solution is to search for each person who has in their Manager item a reference to the person represented by the data entry in question. So, when the data entry for GUI Manager 375 is displayed, a query of the directory server is performed, seeking each employee for whom the Manager data item has a reference to GUI Manager 375. In that manner, both Dave Programmer 310 and Sally Coder 320 would be found and their names displayed. This is another illustration of the derived attribute Direct Reports 116 discussed earlier.

Figure 3B:
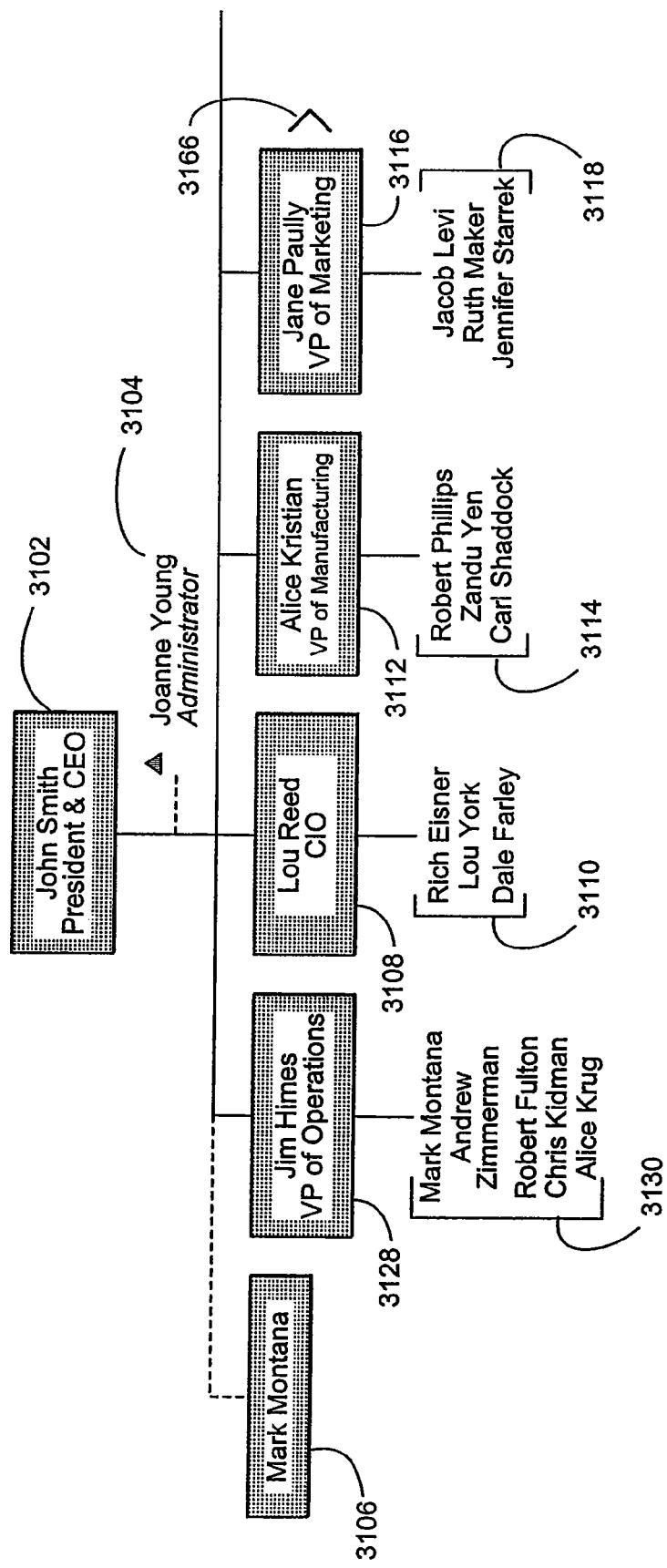
FIGS. 3B, 3C, 3D, 3E, and 3F illustrate alternate embodiments of the display of an alternative organizational chart.

Turning to FIG. 3B-3F, an alternative embodiment of an organizational chart is illustrated. FIG. 3B displays a first portion of a top-level of an organizational chart, starting with John Smith 3102. Underneath John Smith 3102 is Joanne Young 3104, Mark Chapman 3106, Jim Himes 3128, Lou Reed 3108, Alice Kristian 3112, and Jane Paully 3116. Because these are not the only people who report to John Smith 3102, the line for the people reporting to John Smith 3102 extends to the right.

Additionally, Mark Chapman 3106 has John Smith 3102 as an Indirect Manager (as exemplified in one embodiment in the discussion of FIG. 1B above). As a result, Mark Chapman 3106 is displayed in a manner different from that of the other people reporting to John Smith 3102. Likewise, because Joanne Young 3104 is the assistant 132 to John Smith 3102, the display of Joanne Young 3104 is different from that of the other people reporting to John Smith 3102. Furthermore, the people reporting directly to each of the displayed people are also shown, in list form. Thus, list 3130 displays the people reporting to Jim Himes 3128, list 3110 displays the people reporting to Lou Reed 3108, list 3114 displays the people reporting to Alice Kristian 3112, and list 3118 displays the people reporting to Jane Paully 3116. Finally, the Next 3166 button allows a user to view the rest of the people reporting to John Smith 3102.

Figure 3C:
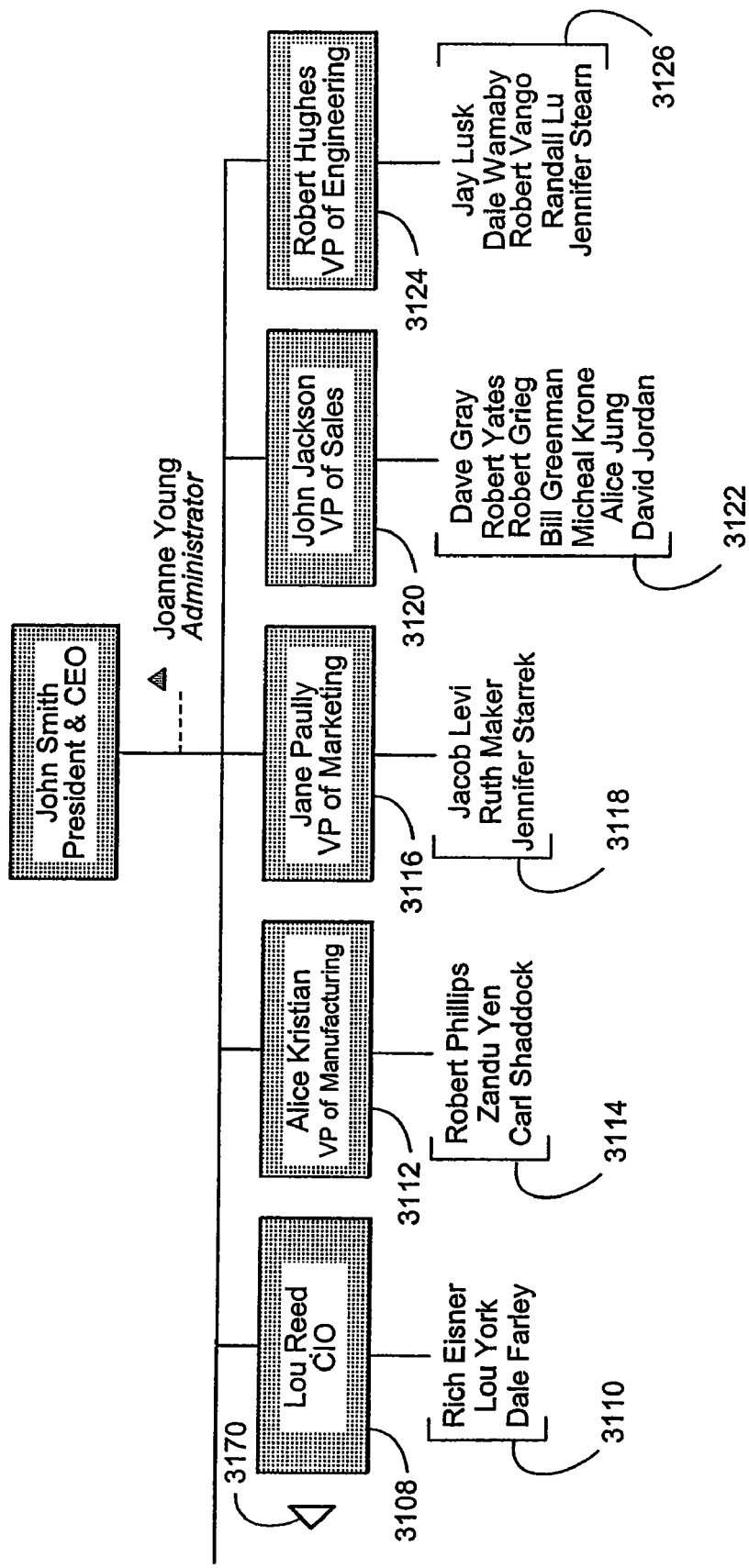

By selecting the Next 3166 button, the user causes the display illustrated in FIG. 3C to appear. The additional people reporting to John Smith 3102 are John Jackson 3120, Robert Hughes 3124, and. The people reporting to each of John Smith 3102's subordinates are shown, with list 3122 displaying the people reporting to John Jackson 3120 and list 3126 displaying the people reporting to Robert Hughes 3124. Also displayed is the Previous 3170 button which allows the user to return to the information displayed in FIG. 1B in one embodiment. Note that the group of Jim Himes 3128, Robert Hughes 3124, John Jackson 3120, Jane Paully 3116, Alice Kristian 3112, Lou Reed 3108, Mark Chapman 3106, and Joanne Young 3104 make up the Direct Reports 136 to John Smith 3102 in one embodiment.

Figure 3D:
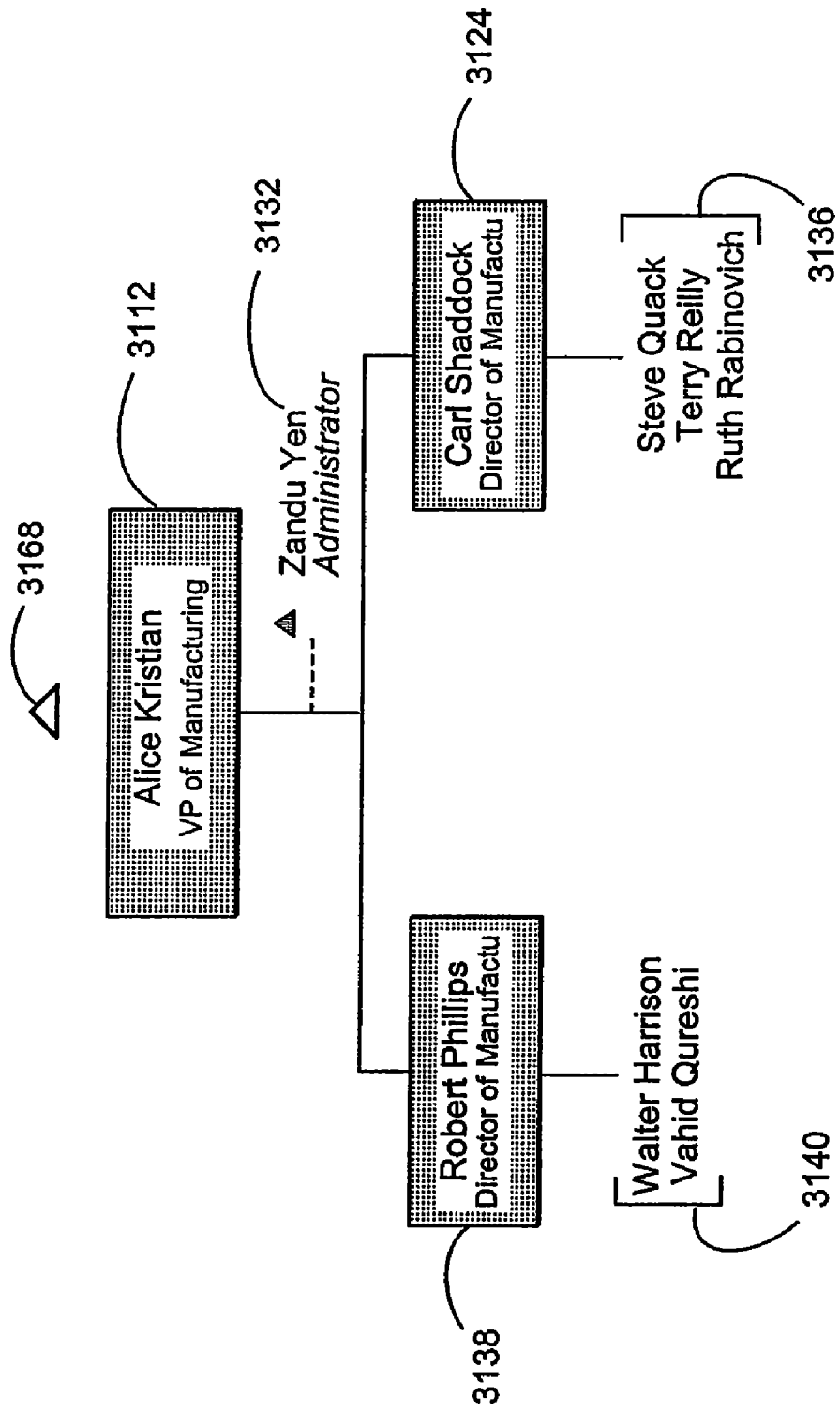

In one embodiment, positioning a cursor over a box other than that associated with John Smith 3102, selecting that box, such as the box for Alice Kristian 3112, and dragging that box to John Smith 3102 causes the display to shift to the organization with Alice Kristian at the top. This display is illustrated in FIG. 3D. In FIG. 3D, Alice Kristian 3112 is displayed, with Zandu Yen 3132 shown as Alice Kristian's 3112 Assistant 132, and the other Direct Reports 136, Carl Shaddock 3134 and Robert Phillips 3138. Note that these three names are the same names that appeared in the list 3114 of FIG. 3B. Likewise, lists of people reporting to Carl Shaddock 3134 (list 3136) and Robert Phillips 3138 (list 3140) appear. Finally, Up Arrow 3168 is displayed, which allows for movement by the user of the display to the next level up in the organizational chart, in this case the display of FIG. 3B.

Figure 3E:
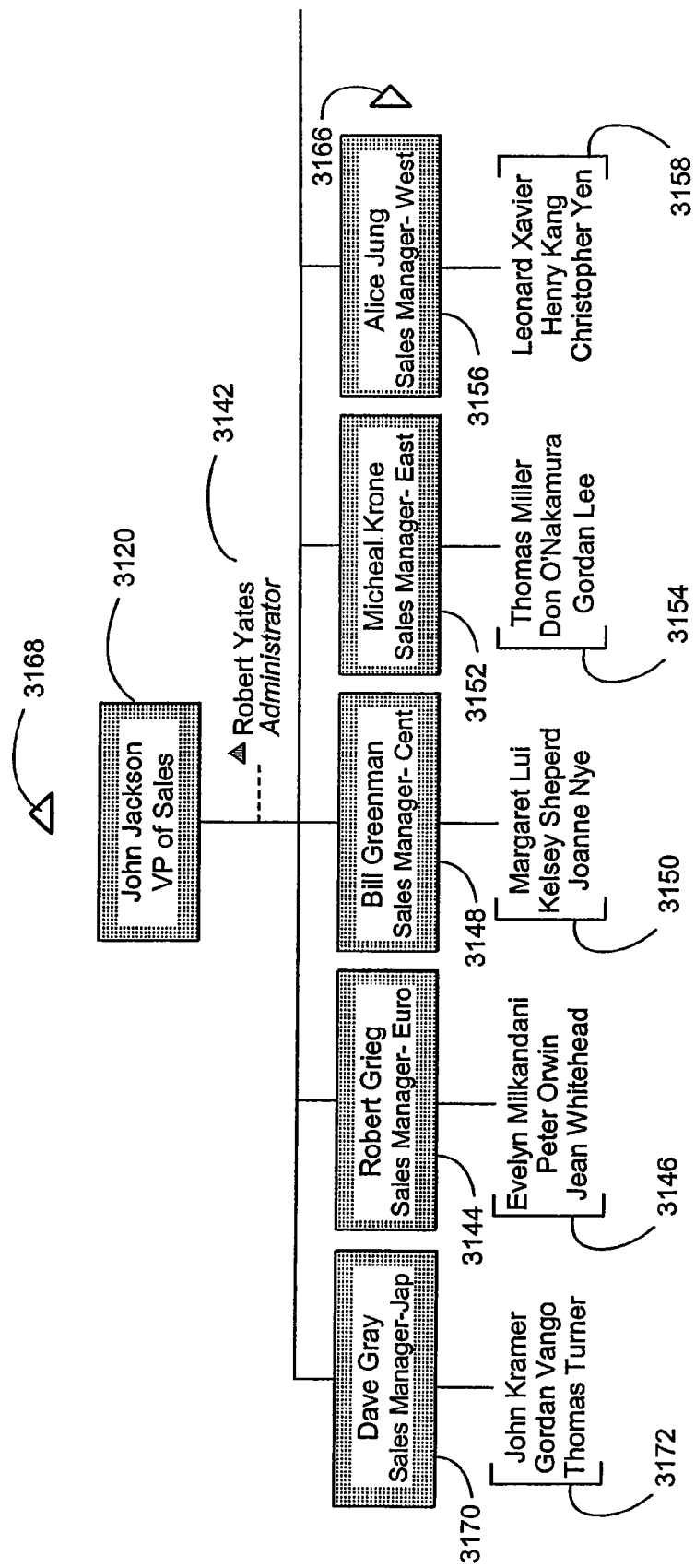

Turning to FIG. 3E, the organization reporting to John Jackson 3120 is displayed. This may be accessed, in one embodiment, by selecting the box associated with John Jackson 3120 as displayed in the illustration of FIG. 3C. In an alternative embodiment, selecting the box for John Jackson 3120 causes the data entry corresponding to John Jackson 3120 to be displayed in a manner similar to that illustrated in FIG. 1B for Joanne Young 3104, and the method outlined above for accessing the display of the organization under Alice Kristian 3112 is employed to display the organization under John Jackson 3120.

Since the number of people reporting to John Jackson 3120, as displayed in list 3122, is too high to allow display on one screen (similar to the situation for John Smith 3102), only the first four people listed are displayed. Those people are Dave Gray 3170, Robert Grieg 3144, Bill Greenman 3148, Michael Krone 3152, and Alice Jung 3156. Not displayed from list 3122 are David Jordan and Robert Yates. Note that each person has people reporting to them, so list 3172 lists the people reporting to Dave Gray 3170, so list 3146 lists the people reporting to Robert Grieg 3144, list 3150 lists the people reporting to Bill Greenman 3148, list 3154 lists the people reporting to Michael Krone 3152 and list 3158 lists the people reporting to Alice Jung 3156. Again, Up Arrow 3168 and Next button 3166 are supplied for accessing other parts of the organization. Note that in this context, Up Arrow 3168 goes to the display illustrated in FIG. 3B, while Next button 3166 takes on the new meaning of shifting to a display of the other people reporting to John Jackson 3120.

Figure 3F:
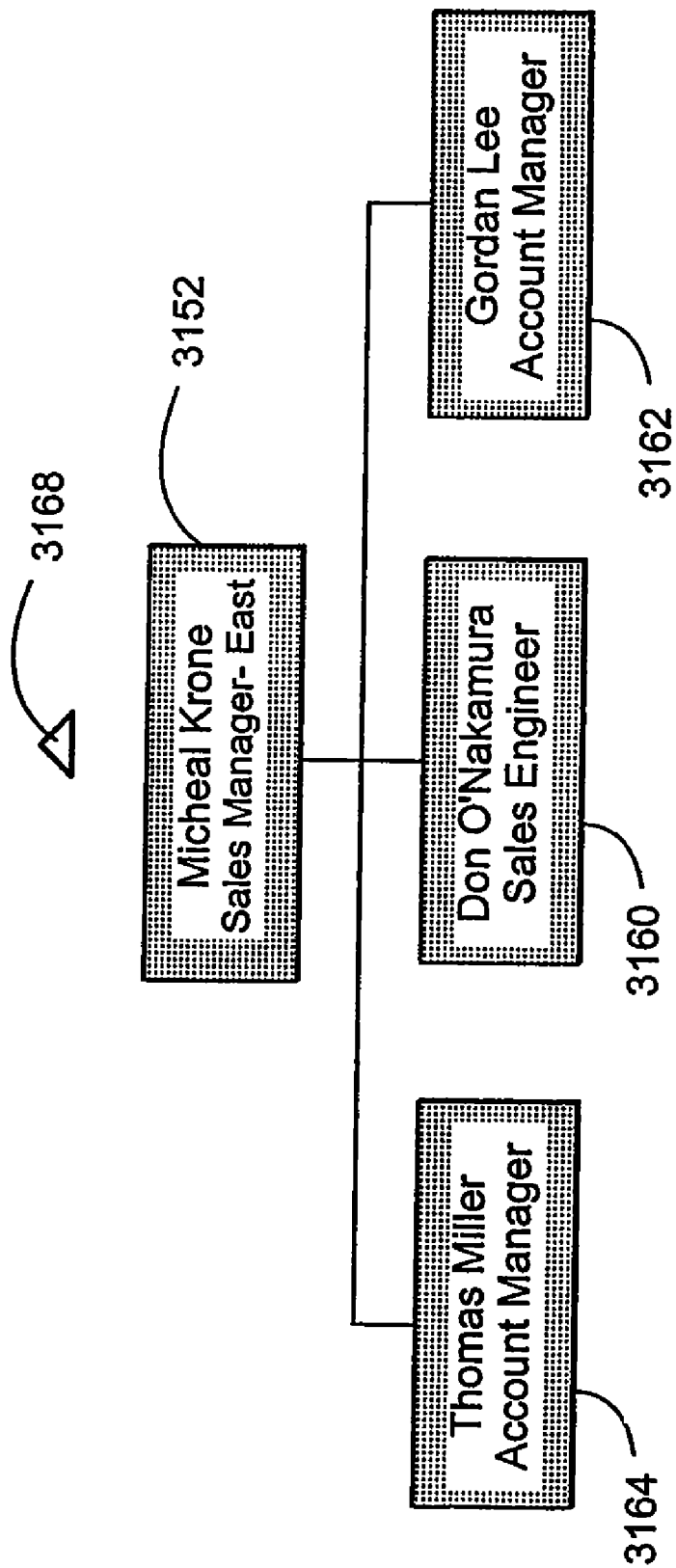

Turning to FIG. 3F, the organization below Michael Krone 3152 is displayed. This can be accessed by selecting the block associated with Michael Krone 3152 illustrated in FIG. 3E and moving it to the block associated with John Jackson 3120. The three people named in list 3154 are illustrated as reporting to Michael Krone 3152. They are Don O'Nakamura 3160, Gordan Lee 3162, and Thomas Miller 3164. Note that since none of these three individuals have any people reporting to them, no lists of direct reports appear. Likewise, since Michael Krone 3152 only has three people reporting to him, no Next button 3166 appears. However, the Up Arrow 3168 does appear, and in this context it leads to the display illustrated in FIG. 3E, since the Manager 130 of Michael Krone 3152 is John Jackson 3120. In one embodiment, moving a mouse over the box associated with an individual causes a separate portion of the display (such as a frame or another window for example) to show some of the information associated with that individual. Likewise, in one embodiment, selecting the box associated with a person without moving it causes the display to switch from the organizational chart to a display of that person's data entry.

Figure 4:
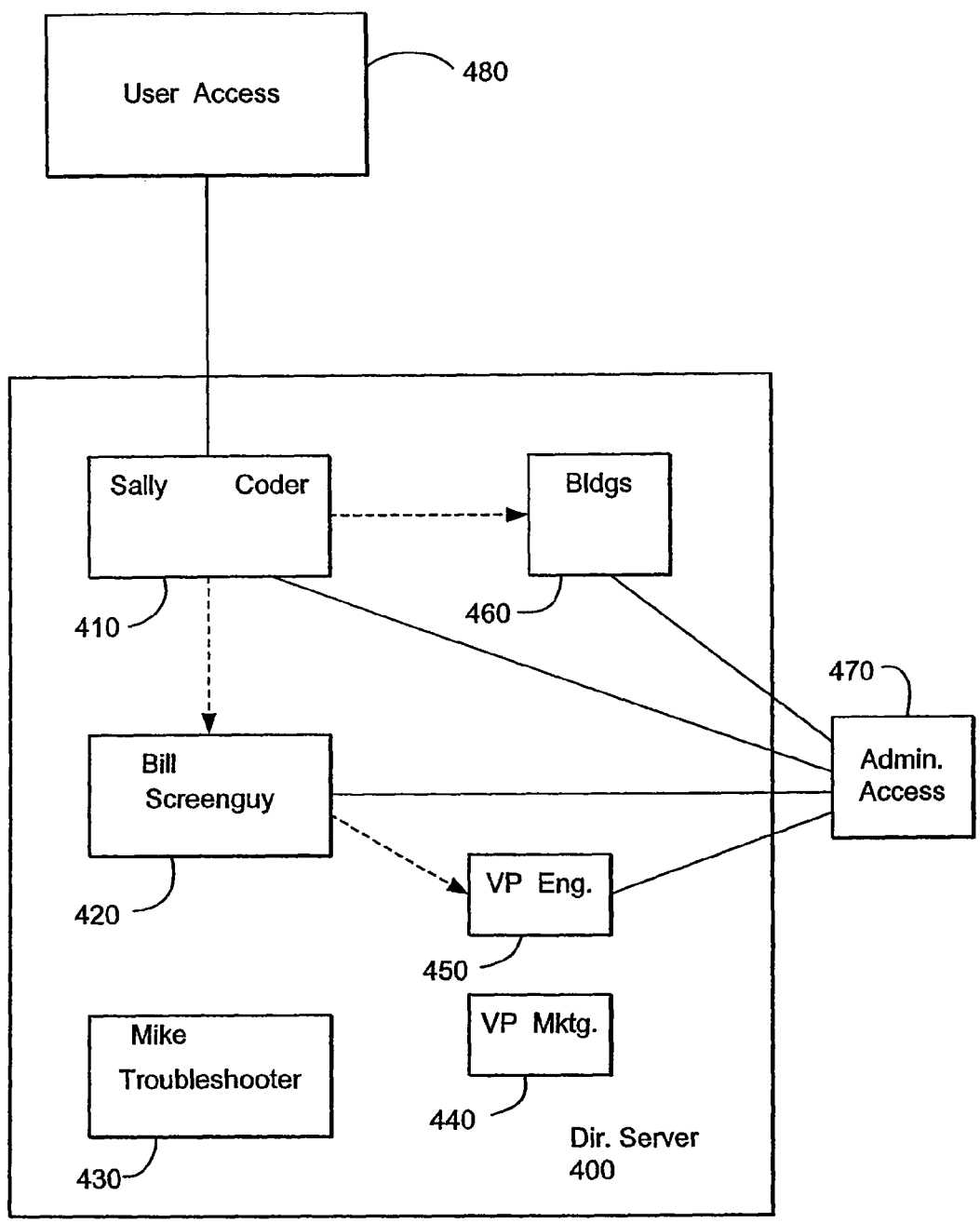
FIG. 4 illustrates a block diagram of some exemplary information that may be stored in a directory server or other information storage systems or media, and who may have access to that information.

Turning to FIG. 4, a block diagram of some exemplary information that may be stored in a directory server or other information storage systems or media, and who may have access to that information is displayed. Directory Server 400 has access to data entries for Sally Coder 410, Bill Screenguy 420, Mika Troubleshooter 430, VP of Marketing 440, VP of Engineering 450, and Buildings 460. Within that data, some cross-references are shown. In one embodiment, the fact that Sally Coder 410 has an office in a first building is represented by a reference within the data entry for Sally Coder 410 to a data entry for a Building in Buildings 460. Likewise, if Bill Screenguy 420 is Sally Coder 410's manager, a reference for the data item for Manager for Sally Coder 410 refers to the data entry for Bill Screenguy 420. Furthermore, if Bill Screenguy 420 reports to VP of Engineering 450, then a similar reference in the data item for Bill Screenguy 420 refers to the entry for VP of Engineering 450.

User 480 may access one data entry at a time for purposes of viewing or updating information, and is shown accessing Sally Coder 410. Note that User 480 may not be limited to accessing one data entry at a time, so much as User 480 will typically only need access to one data entry at a given time. Administrator 470 is shown accessing VP of Engineering 450, Bill Screenguy 420, Sally Coder 410, and Buildings 460. Administrative access such as that of Administrator 470, in one embodiment, is less constrained than that of User 480's access, such that Administrator 470 may access more information at any given time, and may access information not available to User 480. For instance, in one embodiment, User 480 cannot access the home address or home phone number of Sally Coder 410, whereas Administrator 470 may access those data items.

Figure 5A:
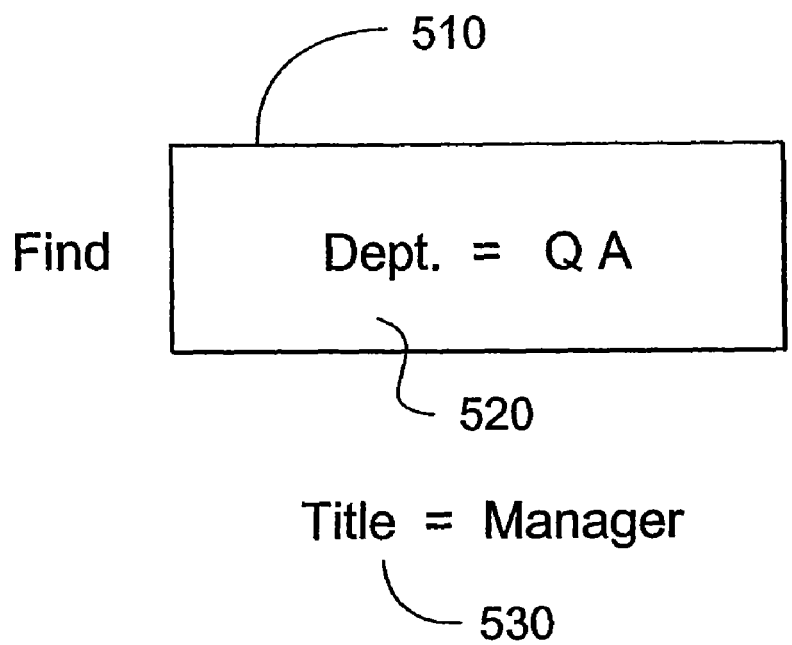
FIG. 5A illustrates an exemplary query that might be used to access information accessible through a directory server.
Figure 5B:
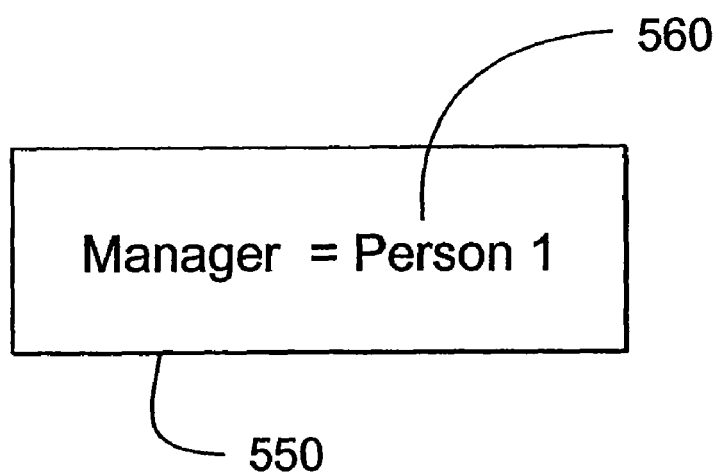
FIG. 5B illustrates an alternative query that might be used to access information accessible through a directory server.

Turning to FIGS. 5A and 5B, different exemplary queries are illustrated. These queries show the form used in one embodiment to query the directory server for specific information. The first query of FIG. 5A shows Query Entry Box 510, in which Query 520 has been entered. Query 520 is in the form of 'attribute'='value' and in this case the attribute is the 'Dept' or Department, and the requested value is 'QA' or Quality Assurance. Such a query will return the data entries which include the attribute-value pair 'Dept=QA' and no others. So, if an entry contained 'Quality Assurance' as the Department rather than QA ('Dept=Quality Assurance'), that entry would not be returned. Query 530 illustrates a similar query, wherein the entries including the attribute 'Title' with a value of 'Manager' are searched for. Note that a title such as CEO or VP would not be found by such a search, even though those titles might imply managerial authority. Note that Display types may come into play here. For instance, the state where a person or building is located may be defined by a display type for states. If the building were in California, the data entry may hold the value 'California' or 'CA' or '5' and a translation is performed when determining which value is searched for or displayed. As such, if '5' is stored but 'CA' is displayed, the query may only recognize 'CA' for California and translate it to '5' or it may recognize alternate terms for California such as 'Cal' or 'Calif' for example.

FIG. 5B illustrates a different form of query. Query 550 is also in the form of an attribute=value. However, PERSON1 560 is a variable, which, in one embodiment, can be substituted with an actual name or a reference to a data entry, such as the unique identifier of a data entry for a person. This query is suitable for determining who the direct reports of a person are, by substituting the unique identifier for that person into the PERSON1 560 variable position. Then, the query will cause a search for all of the data entries which contain a Manager attribute with a value equal to the unique identifier for the person in question.

Turning to FIG. 5C, a partial list of the results of a query of the form "Name='j'" in is illustrated. Note that as the caption indicates, entries 17 to 24 of the 25 entries found using the query are displayed in this illustration. The display of the results of the query is a report of the results, a report of the data entries found to satisfy the query. In FIG. 5C, the results have several fields displayed, organized alphabetically by the Name 112 associated with each displayed data entry. Name column 5110 contains the Name 112 item, E-Mail Address 5120 column contains the Email 118 item, Title column 130 contains the Title 114 item, Phone Number column 5140 contains the Phone 116 item and Organization column 5150 contains the Organization 164 item associated with each data entry displayed. Customize button 5160 allows a user to customize the view of the report, perhaps removing the Organization column 5150 or adding a Building column for Building 138 items for example.

Alternately, information for the results may be displayed using a J-card format. Such a format may have a few lines of text set on a background similar to a notecard or business card in one embodiment, and the lines of text may include information such as Name 112, Email 118, Title 114, Phone 116, and Organization 164. Furthermore, in one embodiment, the partial list of results may be displayed by name, and passing a mouse or other representation of a pointing device over a given name causes a centrally located J-card to reflect the information in the data entry corresponding to that name.

Figure 5D:
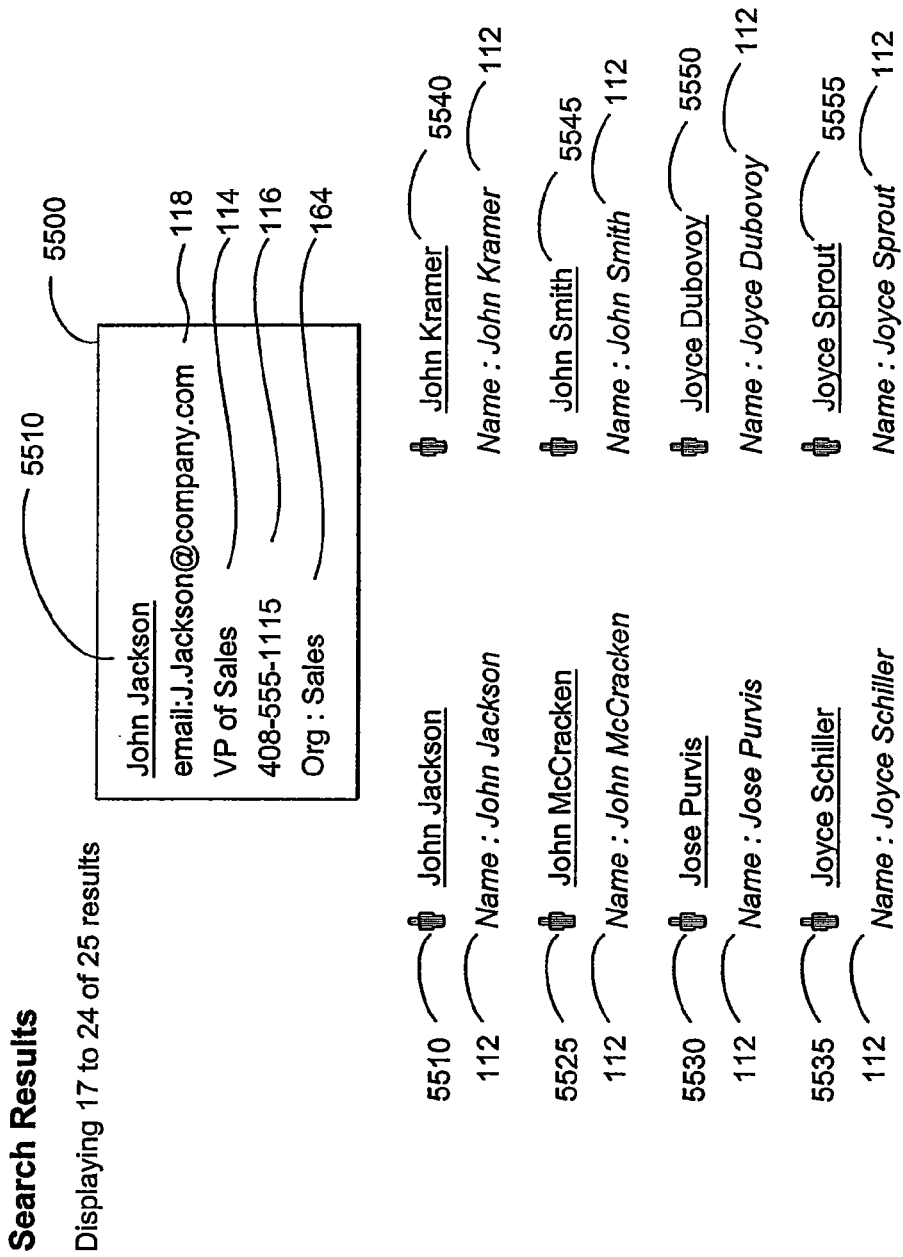
Figure 5E:
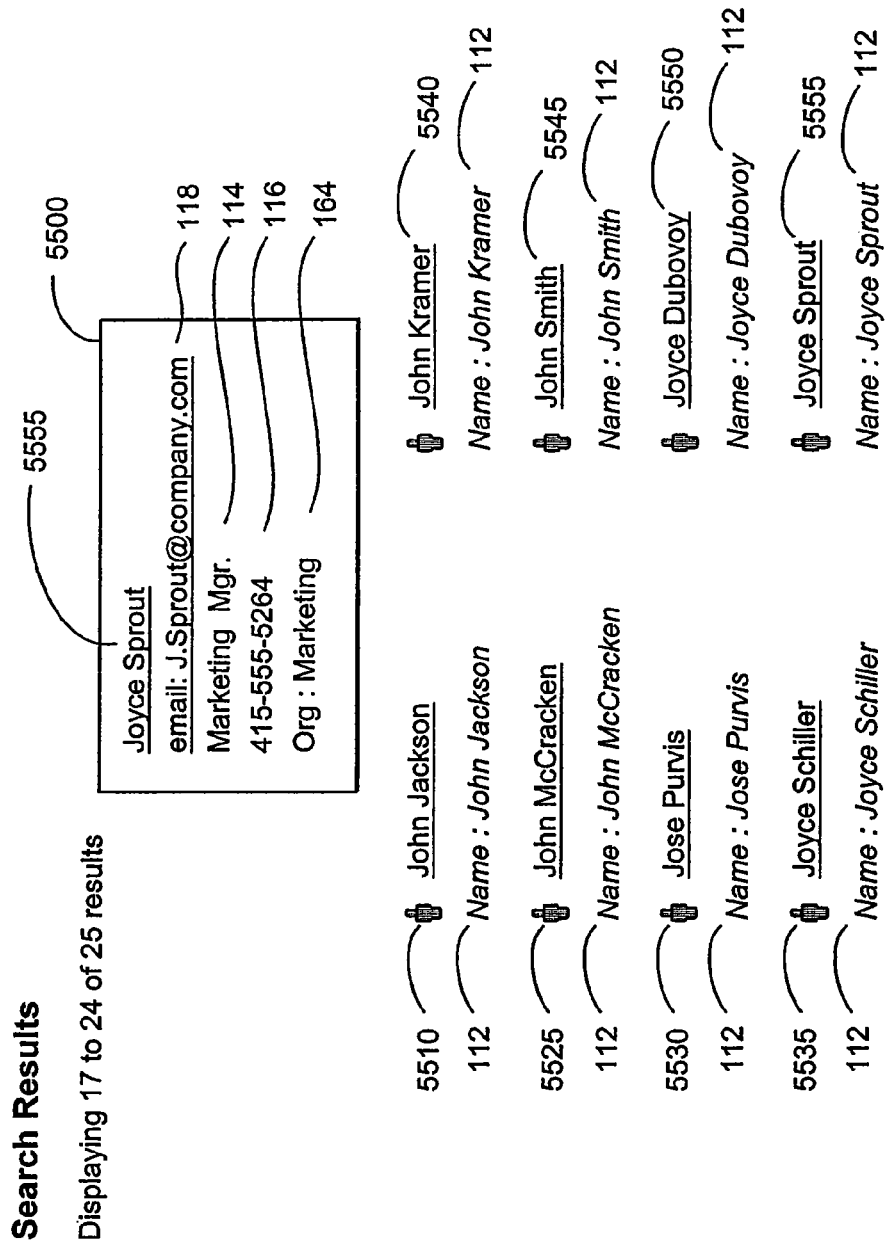

Such a J-card form of display is illustrated in FIGS. 5D and 5E. FIG. 5D illustrates the same entries 17 to 24 of 25 illustrated in FIG. 5C. J-card 5500 displays a data entry unique identifier, in this example identifier 5510 for John Jackson, an email 118, title 114, phone number 116 and organization 164. Below the J-card, the name 112 for each of the eight entries is displayed. Additionally, the unique identifier for each entry is displayed. These include identifier 5525 for John McCracken, identifier 5530 for Jose Purvis, identifier 5535 for Joyce Schiller, identifier 5540 for John Kramer, identifier 5545 for John Smith, identifier 5550 for Joyce Dubovoy, and identifier 5555 for Joyce Sprout. When a user passes a cursor or other selection device over the identifier 5555, the display of FIG. 5E is shown. The only difference between FIGS. 5D and 5E is that J-card 5500 now shows the identifier 5555 for Joyce Sprout and corresponding information in each of the other four fields, rather than the previously displayed information for identifier 5510. One will appreciate that a similar form of display may be adopted for use with the organizational charts of FIGS. 3B-3F, wherein passing a cursor or other pointing device or representation over the box associated with an entry will cause the information for that entry to be displayed in a corresponding J-card similar to J-card 5500.

Figure 5F:
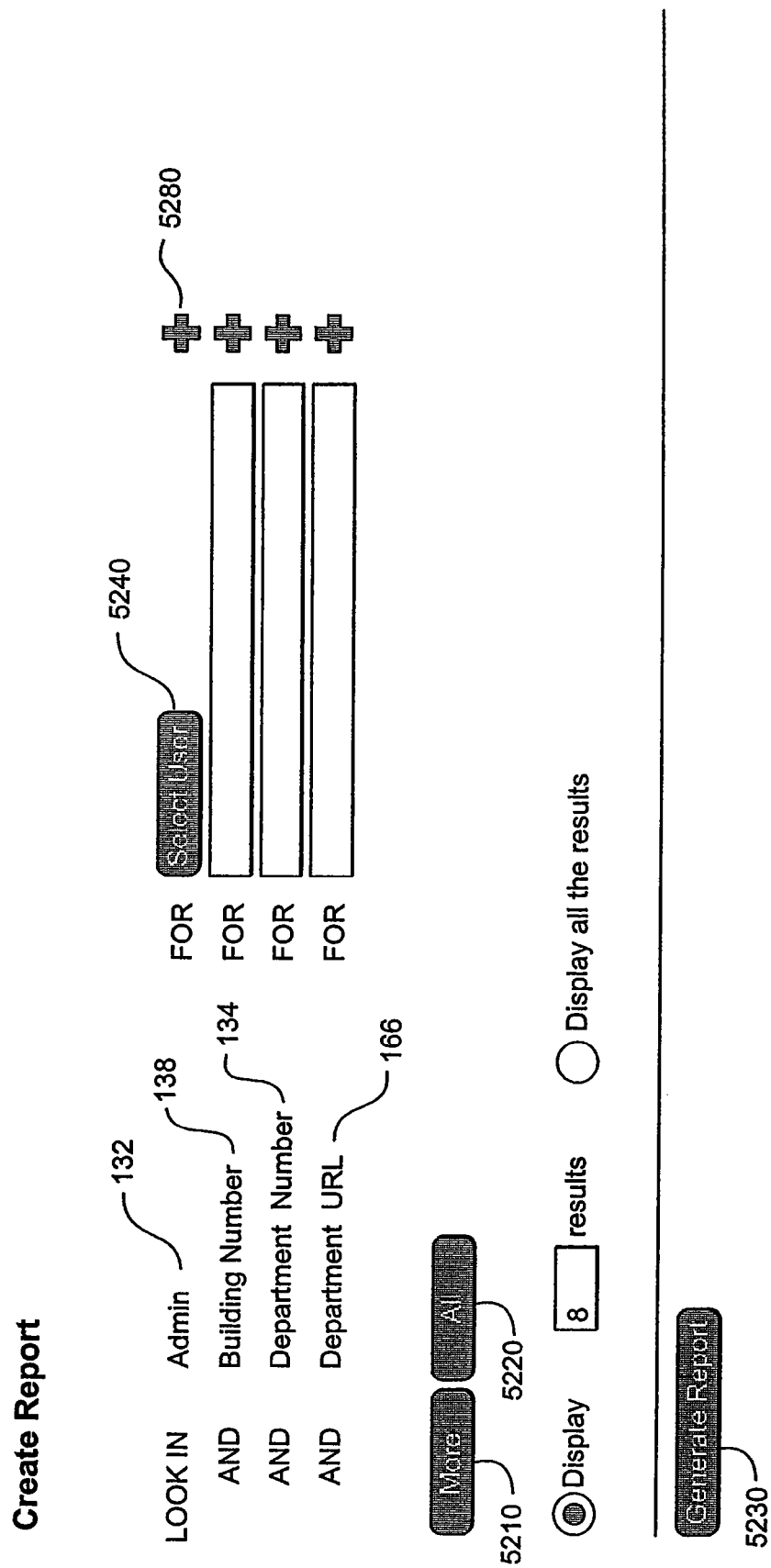

As will be appreciated, some queries will be run frequently, and updated information from these queries will likewise be useful. For that purpose, a report may be created, and initial creation of such a report is illustrated in FIG. 5F. FIG. 5F shows four fields which may be used for purposes of building a query, corresponding to the Admin (or Assistant) 132, Building 138, Department 134 and Department URL 166 attributes of a data entry. In one embodiment, users or people associated with data entries, are selected using the Select User 5240 button. The Select User 5240 button results in an index of all people accessible by the directory server being available to the person creating the report, such that the person may select which users should be searched. Alternatively, no users may be selected, and all users accessible by the directory server will be checked for a match with other criteria of the query. The Logical OR 5280 symbol allows a user, when it is selected, to specify multiple values, any of which will satisfy that portion of the query, such that a user may specify a match for Department 134='1175' or Department 134='1176' or other combinations of values. More button 5210 and All button 5220 allow a user to access more fields or attributes which can be specified for the query, and are discussed below. Generate Report button 5230 may be selected if the user is satisfied with the query, in which case the query is sent to the directory server and a report of the data entries satisfying the query is generated.

Figure 5G:
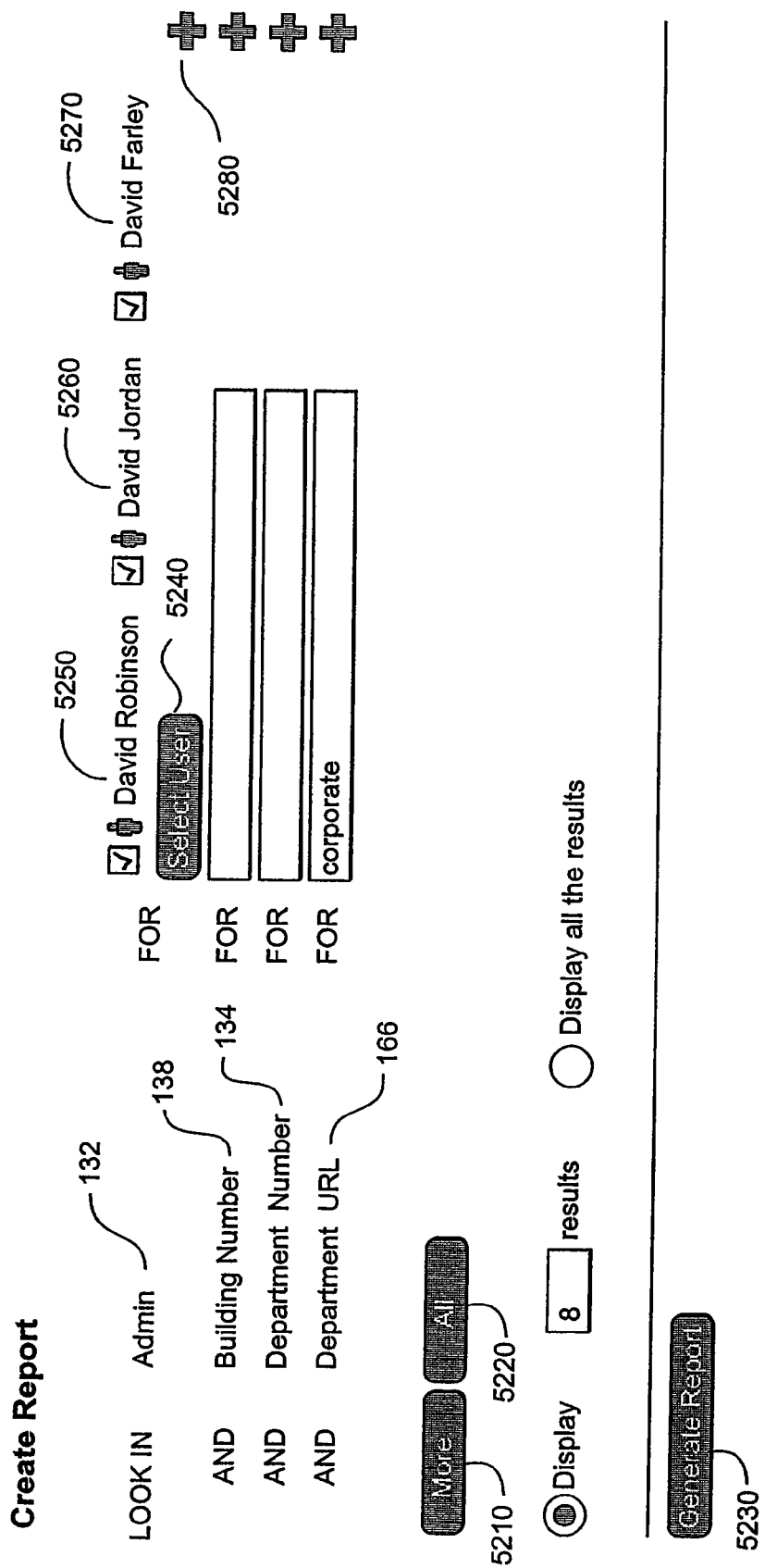
Figure 5H:
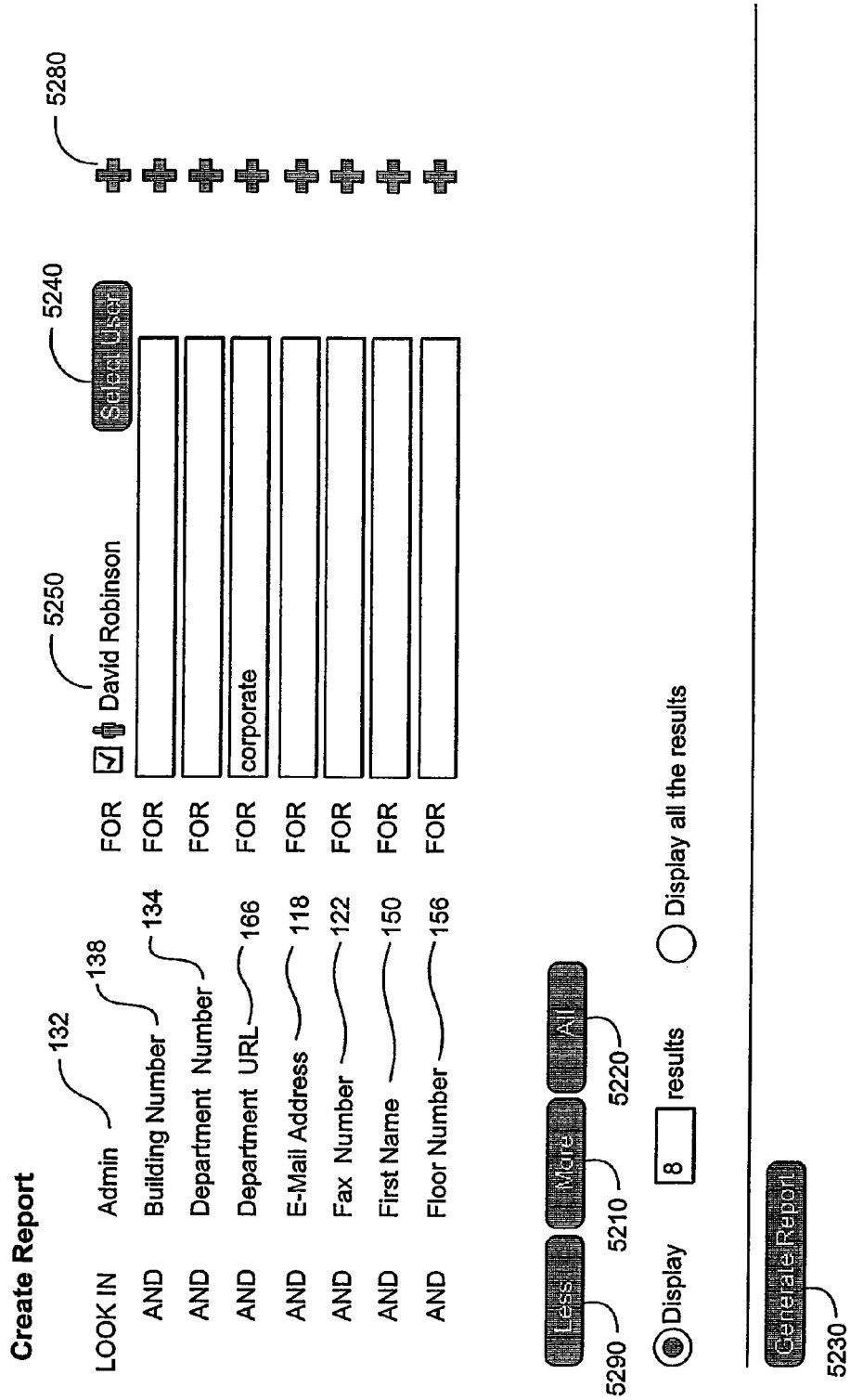

Turning to FIG. 5G, a partially complete query is displayed, in which user David Robinson 5250, user David Jordan 5260 and user David Farley 5270 have been selected. Note that more users may be selected, and that in one embodiment, a user may be selected as not matching, thereby excluding that user from the results of the query. A further specification to the query has been made in that Department URL 166 must begin with 'corporate' to satisfy the query. In an alternative embodiment, this specification would indicate that Department URL 166 must contain 'corporate' to satisfy the query. Upon selecting More button 5210, in one embodiment, the fields or attributes available for selection expands to that shown in FIG. 5H. In FIG. 5H, additional fields corresponding to attributes Email 118, Fax 122, First Name 150 and Floor Number 156 are available for specification by the user. Additionally, Less button 5290 is added, allowing the user to select display and availability of fewer fields. Note that in the transition to FIG. 5H, the users David Jordan 5260 and David Farley 5270 were deselected. This deselection need not occur, and only reflects a further action taken by the user before selecting the More button 5210.

FIG. 5J illustrates a report generation display when the All button 5220 is selected. At this point, all fields or attributes which may be specified for a query are displayed. These include all of the fields described for FIGS. 5G and 5H, along with the Indirect Manager 162, Last Name 152, Mailing Address 140, Mailstop 160, Manager 130, Cell 124, Name 112, Organization 164, Pager Email Address 127, Pager 126, Phone 116, Projects 170, Room Number 158, Skills 168, and Title 190 attributes. Note that the Organization 164 attribute is set up as a display type, with the available values shown in a scrollable window. As will be explained below, the display types may be configured in a variety of ways. Likewise, the Admin 132, Indirect Manager 162, and Manager 130 attributes are configured as display types indicating that they refer to other data entries, and they all use the Select User 5240 button.

It will be appreciated that once a query is created, storing it for future use can be beneficial. FIG. 5K illustrates a list of reports that may be generated by running an associated query created at a prior time. In one embodiment, these report keys encode the query used to search for the contents of the report, and are either stored by the user or transferred to the user, through email for example. The reports are classified by Report Name 5310 and have an accompanying Report Description 5320. Engineering Report 5322 queries the directory server for all entries corresponding to employees in the Engineering Department. Building 1 Report 5324 queries the directory server for all entries corresponding to employees in Building 1, and Building 2 Report 5326 performs a similar query to find all employees in Building 2. Finally Company VPs Report 5328 queries the directory server for all entries corresponding to a title of Vice President. As will be appreciated, further reports may be created and reports may also be removed when they are no longer useful. In one embodiment, the name of a report as illustrated in FIG. 5K is linked to a URL. The URL is activated when the name is selected, and the URL encodes the query for generating the report, such that selecting the name causes the query to be sent to the directory server and the report generated.

FIG. 5L illustrates part of the results of running the Engineering Report 5322. The results must be generated into a useful form, by accessing the data in each data entry identified by the query, and organized into a coherent form, such as sorting by alphabetical order on an attribute such as Name 112 for example. The resulting data entries have information from some of their data items displayed. Note that the columns are arranged in a different order from that illustrated in FIG. 5C, as a result of customization of the display of the report. Also, the data items may be displayed in a J-card format as described above.

Figure 5M:
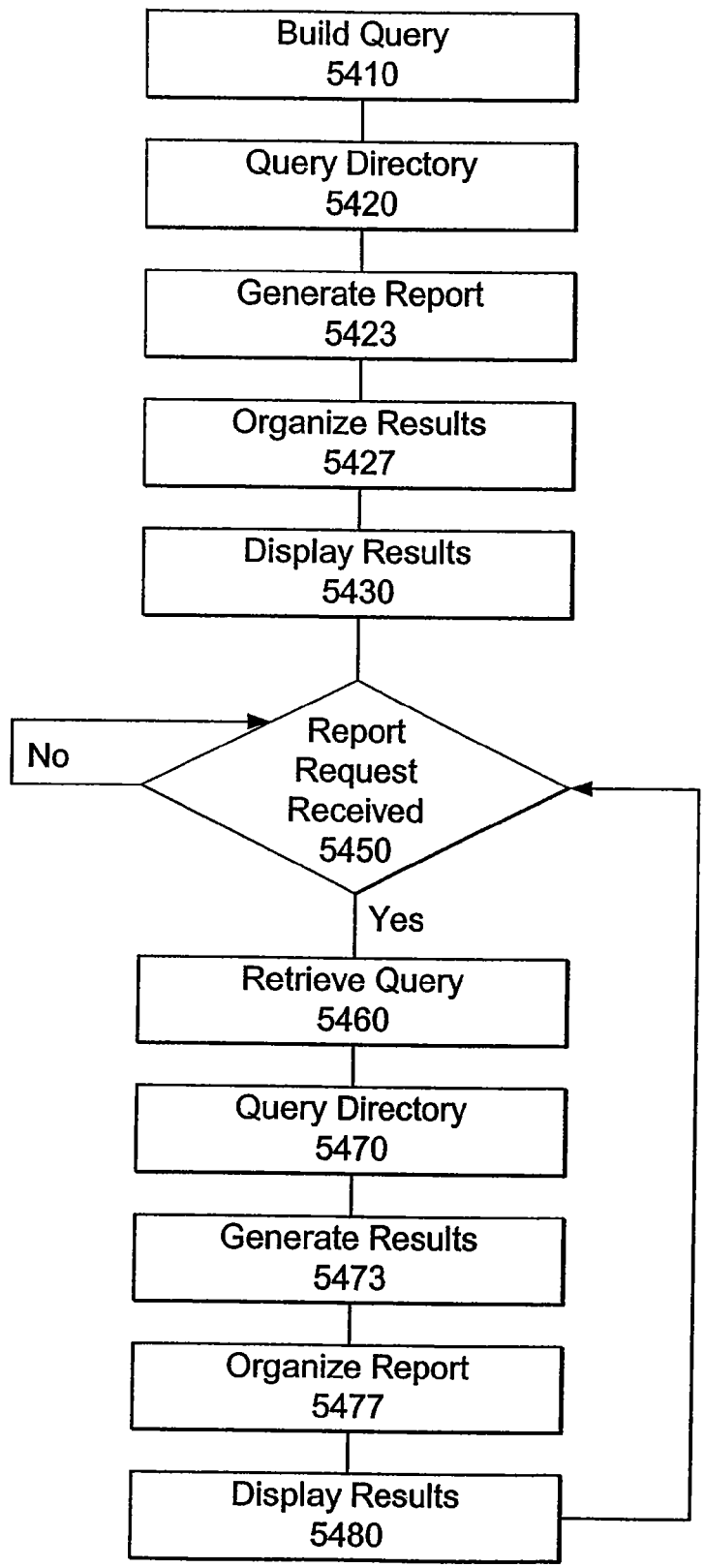
FIG. 5M illustrates an embodiment of the process of creating and using a report and its associated query.

Turning to FIG. 5M, one embodiment of the process of creating and using a report is illustrated. Initially, Build Query 5410, constituting building a query as partially illustrated in FIGS. 5F, 5G, 5H, and 5J occurs. Note that other methods of building such a query may be employed. Following that, Query Directory 5420 occurs, during which the directory server is sent the query built in Build Query 5410 and responds with results of entries matching the query. Generate report 5423 then occurs, in which the data entries matching the query are accessed, followed by Organize results 5427 in which the data entries are organized into a coherent or ordered form. Those results are displayed in Display Results 5430, as exemplified in both FIGS. 5C and 5L, although other methods and custom displays may also be used. It will be appreciated that even though the query has been built, Query Directory 5420 and Display Results 5430 need not occur prior to Save Query 5440. Save Query 5440 results in storage of the information necessary to locate the query built in Build Query 5410 and execute it. This information may be stored in a persistent manner by storing it on a server accessible by users of the directory, since the server will typically have sufficient backup capabilities in terms of both power supply and data retention that information stored there may be retrieved at virtually any time. This information may also typically be stored in a non-volatile memory, including but not limited to a disk drive, FLASH memory, CD-ROM or other optical drive, or other non-volatile memory. Next the method proceeds to Request Received 5450 in which the method awaits another request to use the query. If no request is received, the method continues to wait. If a request is received, the query is retrieved from storage in Retrieve Query 5460, and the Directory is queried in Directory Query 5470, similarly to the query process in Query Directory 5420. Likewise, the process of Generate results 5423 repeats in Generate Results 5473 and the process of Organize results 5427 repeats in Organize Results 5477. Finally, the results of the query of Directory Query 5470 are displayed in Display Results 5480, and the method then proceeds to wait again at Request Received 5450 until the query is used again.

Figure 6A:
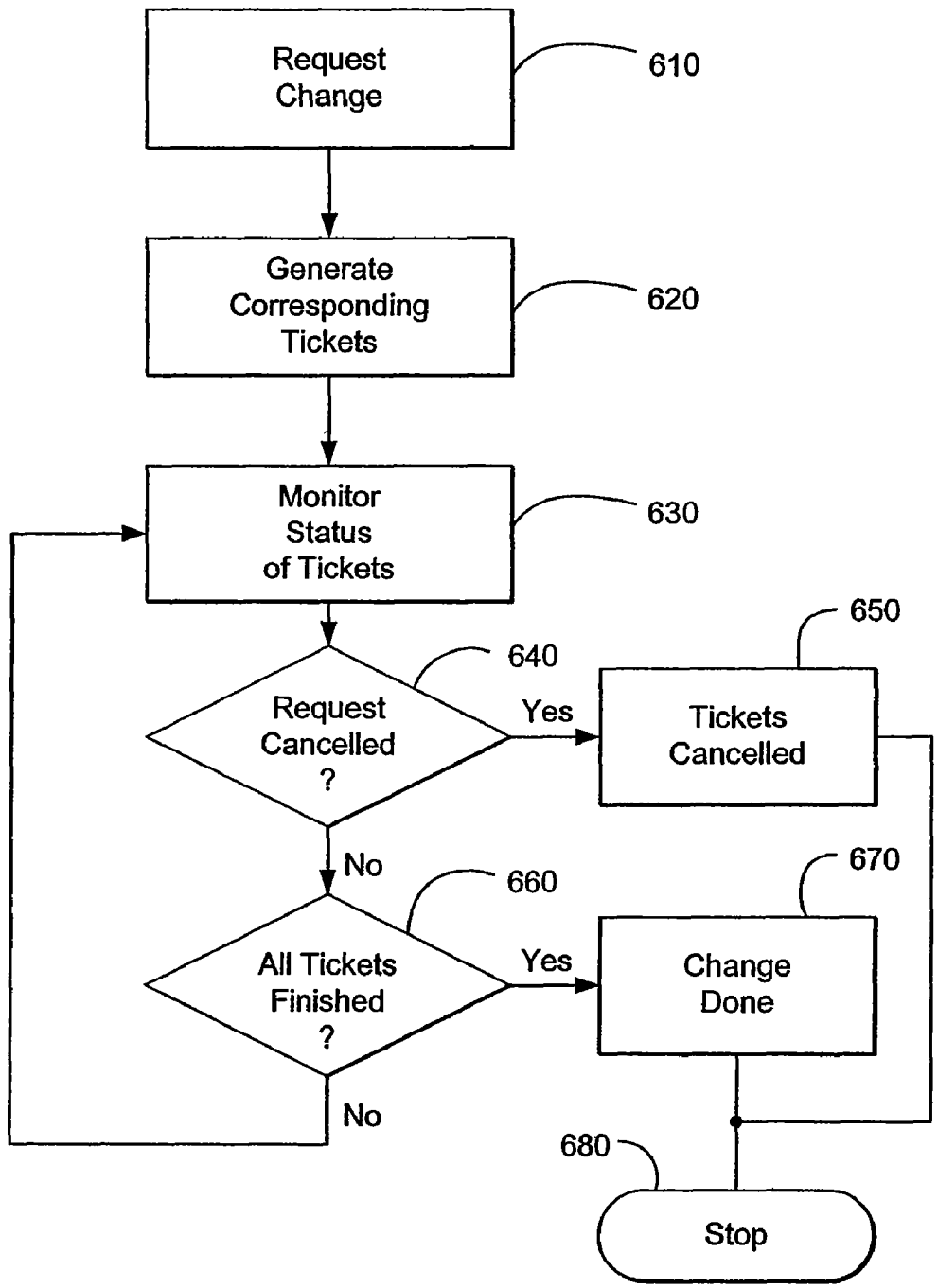
FIG. 6A illustrates one embodiment of how a change occurs.

Turning to FIG. 6A, one embodiment of how a change occurs is illustrated. A change is requested at Request Change 610. A change may include a person transferring to a new department, requesting a new computer, or changing information in the data entry for example. For exemplary purposes, a request for a new computer will be assumed. Ticket Generation 620 results in generation of tickets appropriate to the tasks necessary to accommodate the request. In the case of requesting a new computer, these tickets may, in one embodiment, include installing the computer, installing a network connection, and installing a surge suppressor. Further tickets may include ordering the computer, or obtaining approval for the request for the new computer.

Ticket Monitoring 630 allows, in one embodiment, all people concerned with the request to monitor the progress of the actions associated with the tickets. When all of the tickets are completed, the requestor knows the computer is available, and until then, the requestor can determine who to contact to speed up the process. Likewise, the person installing the computer can monitor whether the computer was ordered, and may determine whether the computer was delivered to the company.

At Request Cancelled 640, it is determined whether the requester, or someone whose approval was required, has cancelled the request. If the request is cancelled, Cancellation 650 occurs, and the pending tickets generated in Ticket Generation 620 are cancelled. If the request is not cancelled, Finishing 660 determines whether all tickets have had their associated actions completed, and either advances to Completion 670 or returns to Ticket Monitoring 630. At Completion 670, all tickets have been taken care of by their owners, indicating that all actions have occurred, and a notification, in one embodiment, may be sent to the requestor informing the requester of the completion, before proceeding to Termination 680 and ending the process. Likewise, Cancellation 650 may, in one embodiment, include notification to the requestor of cancellation of the request before proceeding to Termination 680.

Figure 6B:
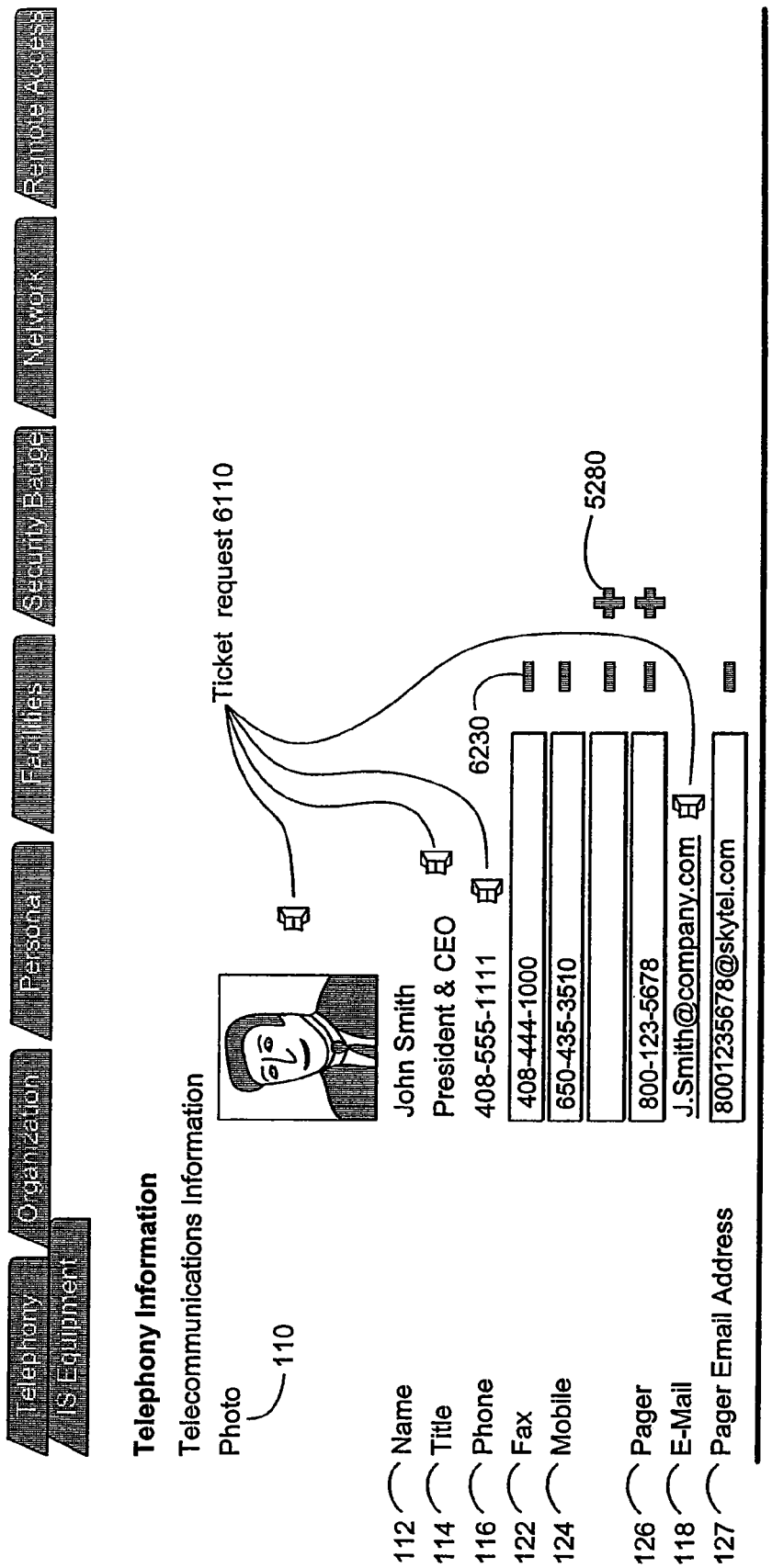

FIGS. 6B through 6J illustrate the process of a change in one embodiment. For example, if John Smith is viewing his telephone information, he may decide to request a change to that information. Upon requesting a change, the illustration of John Smith's directory information in FIG. 6B is displayed, including Photo 110, Name 112, Title 114, Phone 116, Fax 122, Cell 124, Pager 126, Email 118 and Pager Email Address 127. Also displayed is ticket request 6110, showing that a ticket must be generated to effect a change in the associated parameters, in this embodiment Photo 110, Title 114, Phone 116, and Email 118. Also displayed are Deletion button 6230 and Addition Button 6150. Deletion button 6230, upon selection, causes the value to the left of it to be deleted from the database without the use of tickets. In an alternate embodiment, Deletion button 6230 may cause generation of a set of tickets targeted at removing appropriate equipment or approving the deletion. Similarly, Addition Button 6150, in this embodiment, causes the addition of another entry for the attribute to the left without the use of tickets. In an alternate embodiment, Addition Button 6150 may result in generation of tickets for addition of equipment of facilities necessitated by the change. Also, Save button 6120 and Cancel button 6130 are displayed. Save button 6120 allows the user (such as John Smith) to save the changes made, and Cancel button 6130 allows the user to cancel the changes and revert to those values previously stored in the data entry.

Figure 6C:
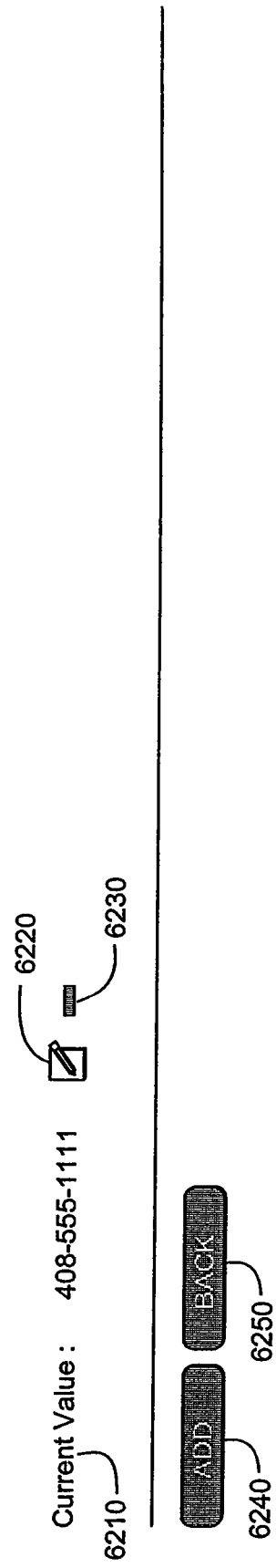

Should John Smith request a change to his Phone 116, FIG. 6C illustrates what is displayed. Current Value 6210 displays what is in the data entry for Phone 116, Change request button 6220 allows the user to request a change and Deletion button 6230 allows the user to request removal of the value. Furthermore, Add button 6240 allows the user to request addition of another entry (such as another phone in this instance) and Back button 6250 allows the user to go back to the previous display and cancel the request for a change.

Figure 6D:
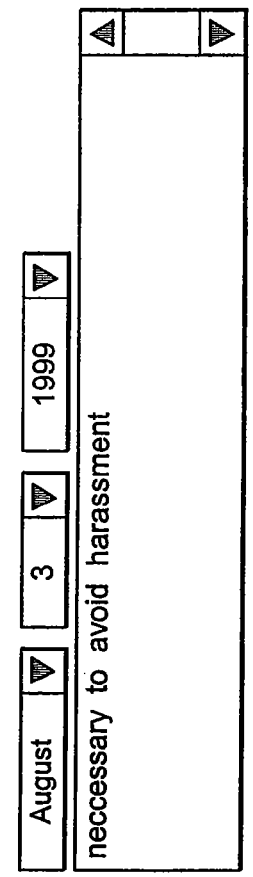

Upon selecting Change request button 6220, creation of a ticket as illustrated in FIG. 6D occurs. Displayed for informational purposes are Request for type 6310 (type of request, such as change, add, delete), Attribute 6320 (the attribute of the data entry whose value should change), Current Value 6330 and Value to be Changed 6340. The user may enter information for New Value 6350, the desired new value, Complete by 6360, the date by which the change should be completed, and Comments 6370. Note that any or all three of these fields may be left blank, if for instance, the user has no preference for a new phone number or no deadline is desired. Finally, Create Ticket button 6380 and Cancel button 6390 allow the user to complete creation of the ticket or cancel the change process respectively.

Figure 6E:
Figure 6E:
Figure 6E:

Having selected Create Ticket button 6380, ticket confirmation is displayed as illustrated in FIG. 6E. A Ticket ID 6410 is supplied, allowing the user and directory server to track the ticket through a unique identifier. Additionally, the request is displayed, in this embodiment by building it from Request type 6310, Current Value 6330 and New Value 6350. The person who may approve the request is illustrated as owner 6390. The owner 6390 is a person who may decide whether the request will be denied or granted, or who must take some action associated with accomplishing the change requested. In one embodiment, the owner 6390 of the newly created ticket is notified via electronic mail of the existence of the new ticket. Note that owner 6390 may alternatively be referred to as processor or otherwise referenced, as tickets may in alternate embodiments have no owner, or have an owner distinct from the person or entity responsible for performing the task associated with the ticket. In one embodiment, the person responsible for approving or denying the request associated with the ticket is the processor and the person responsible for carrying out the task associated with the ticket is the owner 6390. In the instance illustrated, Error Message 6380 indicates that a problem occurred in the attempt to notify the owner of the new ticket, which means the user may choose to notify the owner in an alternate manner, and which means remedying the problem may be required, too. It will be appreciated that such an error does not mean the ticket was not created. In fact, since tickets are, in one embodiment, held in a service queue for the person responsible for the ticket, such as owner 6390, the owner 6390 would find the new ticket the next time owner 6390 requests display of owner 6390's associated service queue. If all goes well, the user selects Done button 6370, and the ticket then continues existence until removed from the system. In one embodiment, tickets are not purged from the system until an affirmative command for such a purge is issued by a system administrator, thus allowing for extensive review of whether actions associated with tickets were actually performed, for example.

Figure 6F:
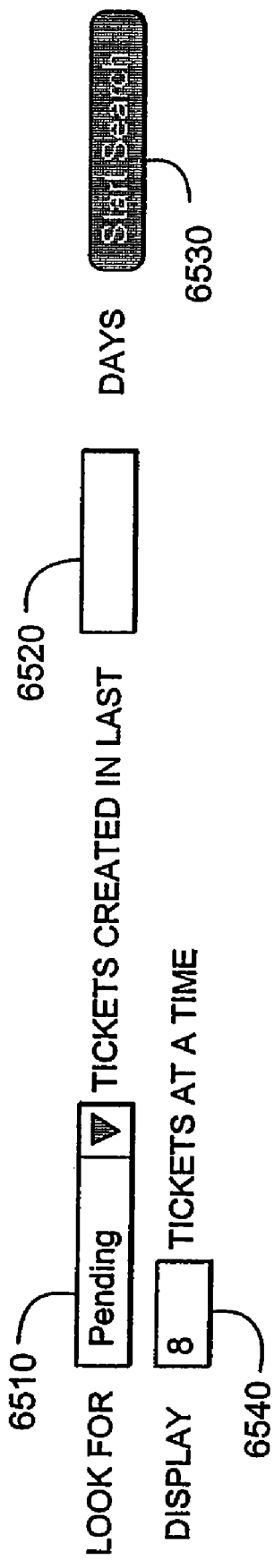
Figure 6H:
Figure 6H:
Figure 6H:
Figure 6H:

Following creation of the ticket, the ticket may be viewed during its pendency or after its completion or denial. FIG. 6F illustrates one embodiment of an exemplary query for finding tickets. In this instance, tickets requested by a certain person (John Smith) are being sought. As a result, the query implicitly contains a requirement such as "Requestor 'John Smith'" or a similar restriction utilizing the unique identifier corresponding to the data entry for John Smith. The query also includes a status of ticket 6510, such as pending, complete, denied, cancelled, or requested for example, a time restriction 6520, which in one embodiment in measured in days, and a number of tickets per page restriction 6540 which controls display of the tickets found to match the query. Upon completion of the desired requirements for the query, selection of the Start Search button 6530 causes the directory server to be queried according to the requirements.

FIG. 6G illustrates a display of a result of the query of FIG. 6F. Since only one ticket existed for John Smith, that ticket is displayed, showing the Ticket ID 6410, Type of change 6310, Status 6510, and Create Date 6610. If the ticket had a Status 6510 of Complete, a Process Date 6620 would also be displayed in one embodiment. In an alternative embodiment, if the ticket were directed at multiple people or multiple actions, a Process Date 6620 or series of Process Dates 6620 may be displayed, indicating when actions were taken. Selecting the Ticket ID 6410 results in the display illustrated in FIG. 6H, where the Ticket ID 6410 and associated information are displayed.

The information associated with the ticket and displayed includes Service 6710 (what should be changed), Create Date 6610, Due Date 6360 (if specified originally), Requestor Comments 6370, Ticket ID 6410 again, Owner(s) 6390, Type 6310, Status 6510, Original Value 6330 and Requested Value 6350. Additionally, Requested By 6730 and Requested For 6740 indicate who requested the ticket and for whose benefit (or detriment) the change will occur, thereby allowing a manager or assistant to request a change for an employee. Likewise, the Employee status 6720 of the person for whom the change was requested is displayed, thus indicating whether the change is appropriate, as adding a cellular phone for a terminated employee for example may not make sense. Finally, the Cancel Request 6740 and Back 6750 buttons are displayed, allowing cancellation or no cancellation to occur with the selection of the respective button.

Figure 6J:
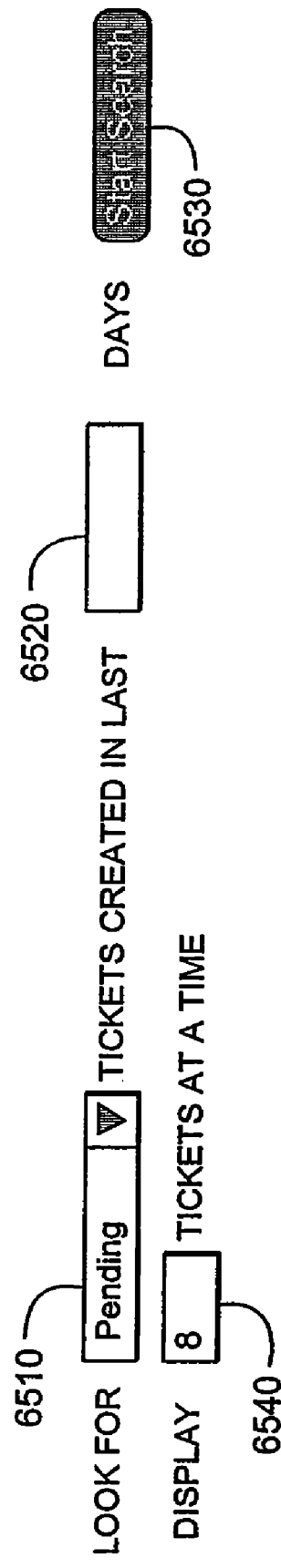

Alternatively, FIG. 6J illustrates a request for tickets a user needs to act on, such that Gordan Smith, the Owner 6390 of the ticket discussed above may investigate what tickets he needs to take action on. In this case, a query similar to that of FIG. 6F is created, but the implied restriction is "Owner='Gordan Smith'" or a similar restriction, rather than the requester restriction of FIG. 6F. Similarly, Status 6510, time restriction 6520 and display restriction 6540 are set prior to selection of Start Search 6530. This request may also be embodied in a request to see the service queue mentioned previously, which would show all tickets a user needs to act on.

Figure 6K:
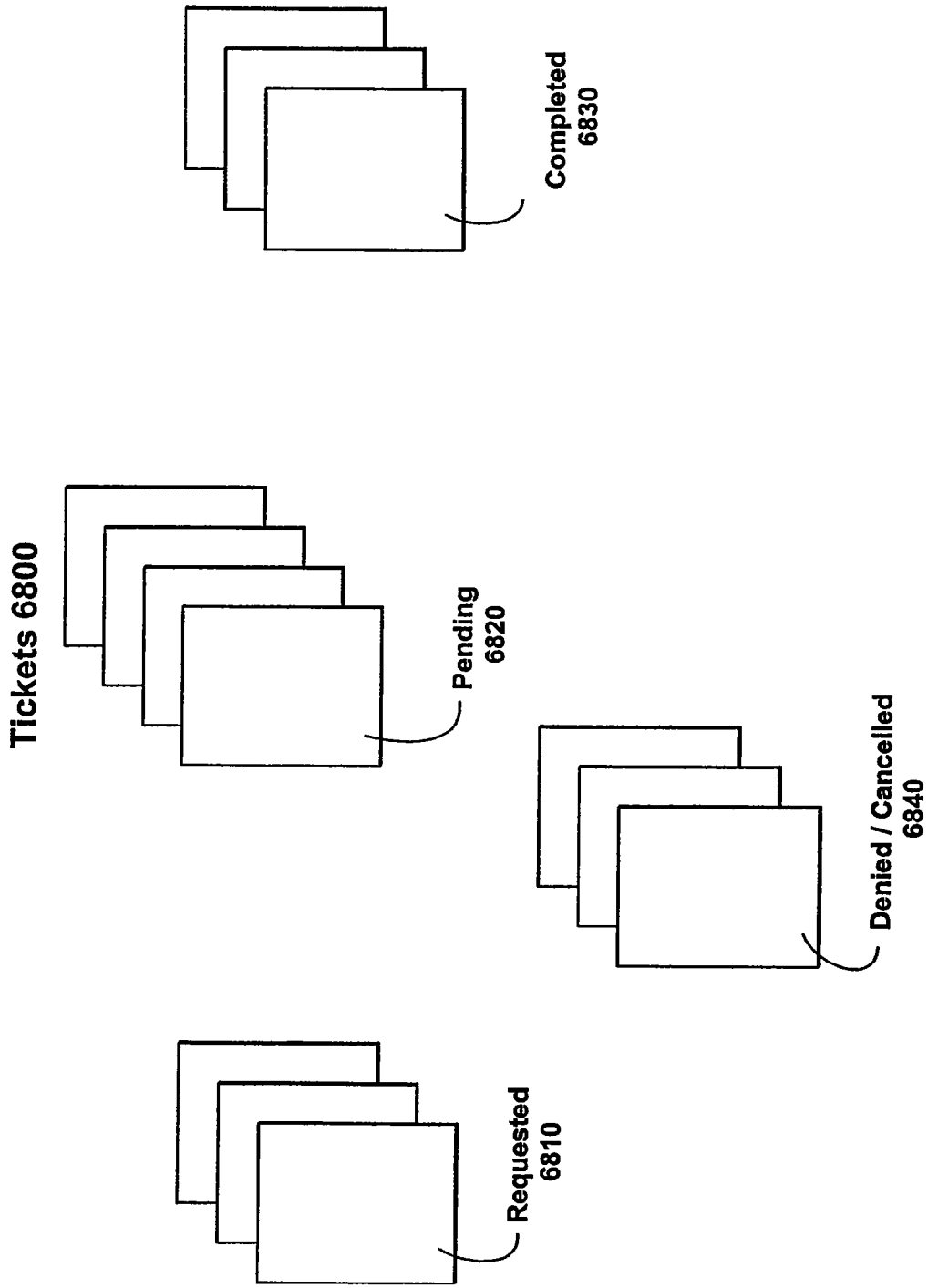
FIG. 6K illustrates one embodiment of the storage and organization of tickets.

In one embodiment, the tickets just described may be thought of as residing in pools of tickets as illustrated in FIG. 6K. Tickets 6800 encompasses the tickets accessible to the directory server. This includes Requested tickets 6810, Pending tickets 6820, Completed tickets 6830 and Denied/Cancelled tickets 6840. In an alternate embodiment, Requested tickets 6810 and Pending tickets 6820 are grouped together. Note that the grouping of tickets may be implemented by setting a status attribute of the ticket to Pending, Completed, Requested, or Denied in one embodiment. It will be appreciated that these groupings may be logical, such that no actual movement of data occurs. For example, updating the status of tickets from Pending to Completed may be accomplished by updating attributes within the tickets, by altering their unique identifiers to specify a new logical location, or by restricting access to the tickets, for example.

Figure 7A:
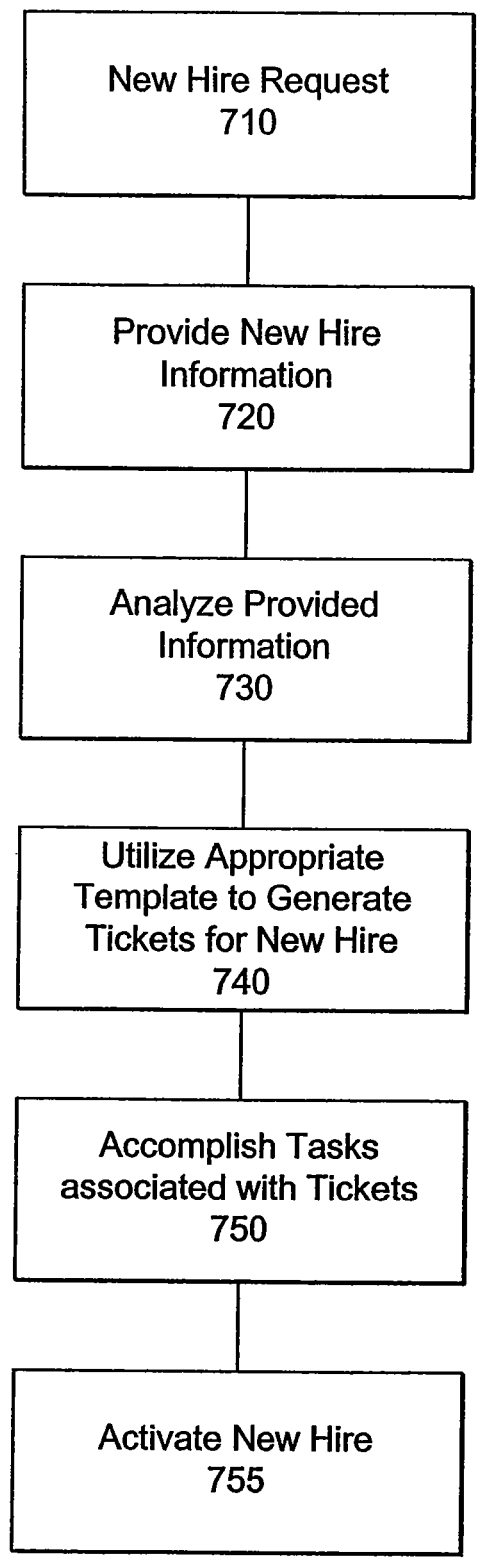
FIG. 7A illustrates one embodiment of how a newly hired employee is integrated into a company.

Turning to FIG. 7A, one embodiment of how a newly hired employee is integrated into a company is illustrated. First, a new hire is requested at Request 710. New Hire information is provided at Provision 720. This information, in one embodiment, may include the name of the new hire, the proposed title, the proposed department, and personal information for the new hire. Analysis 730 involves looking at the information provided in Provision 720. Based on the title and department of the new hire, a template is selected. Such a template details what resources are needed by the new hire for integration into the company, such as an office location, a new phone, a computer, and other resources. A person in the sales department might require a portable computer and a cellular phone, whereas an engineer might require a powerful desktop computer and after-hours access to the building. Based on the chosen template, Ticket Generation 740 results in tickets being generated, with each ticket associated with an action necessary for integrating the new hire into the company, such as readying an office, adding a phone line, providing a computer, issuing parking permits. Finally, with the tickets generated, Accomplish Tasks 750 results in the tasks associated with the tickets being accomplished in an efficient manner such that the New Hire is Activated 755 and may start work with the company quickly.

Figure 7B:
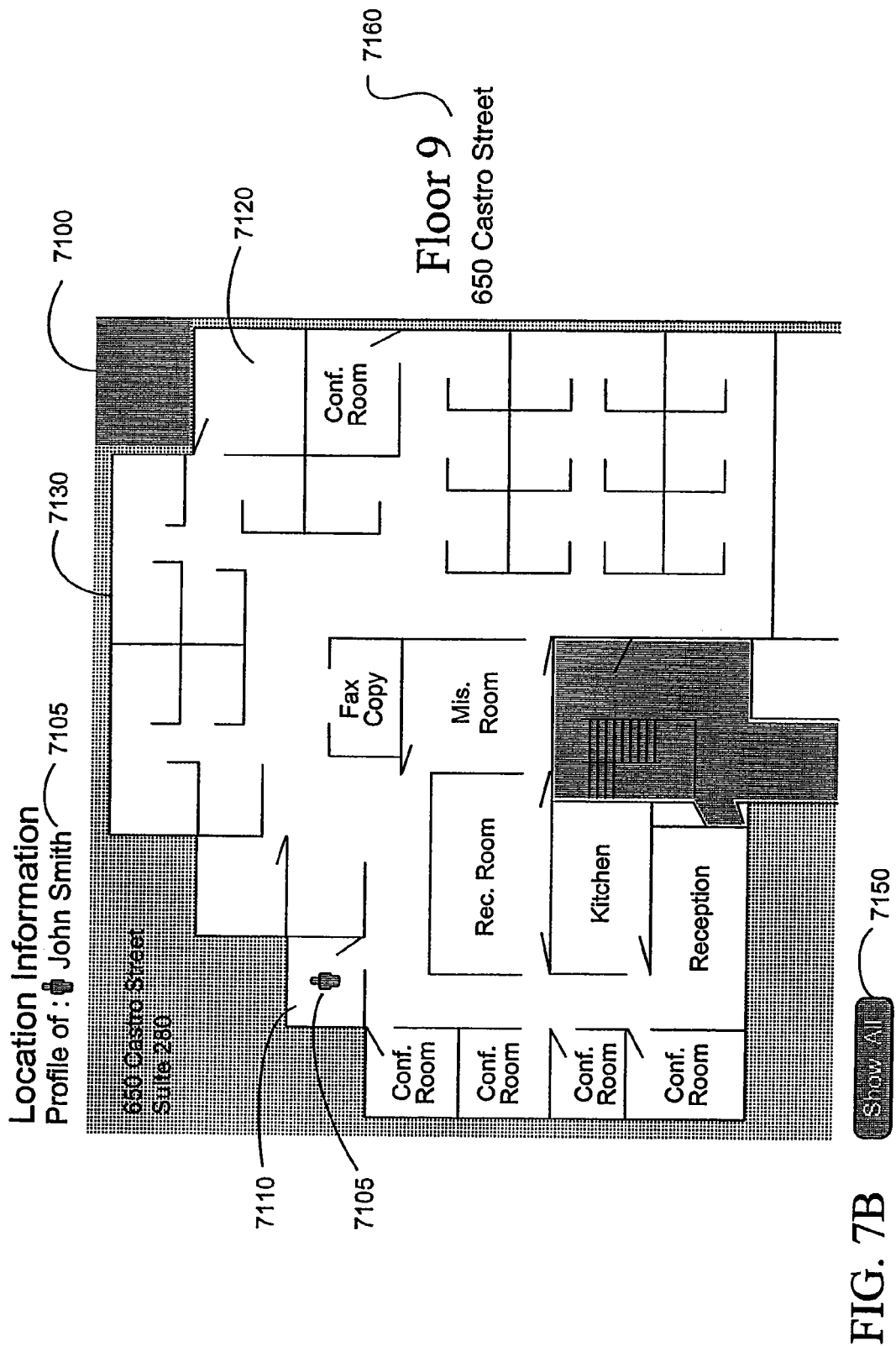
FIGS. 7B and 7C illustrate location of an employee.

In adding a New Hire to the company, choosing where the new employee will work must occur. Likewise, finding the new employee, and the new employee finding his or her way to other people's offices is important. The Locate button 172 of FIG. 1B can help in this regard, and selecting the Locate button 172 results in a map being displayed to show where an employee is located. FIG. 7B illustrates a map 7100 of a floor in the building. Title 7160 indicates what the map shows. Employee 7105, John Smith, is located in office 7110. Since only John Smith is shown in this display, Mr. Smith may choose to attempt to move to an office such as office 7130 or office 7120. However, the Show All button 7150 can simplify this process.

Figure 7C:
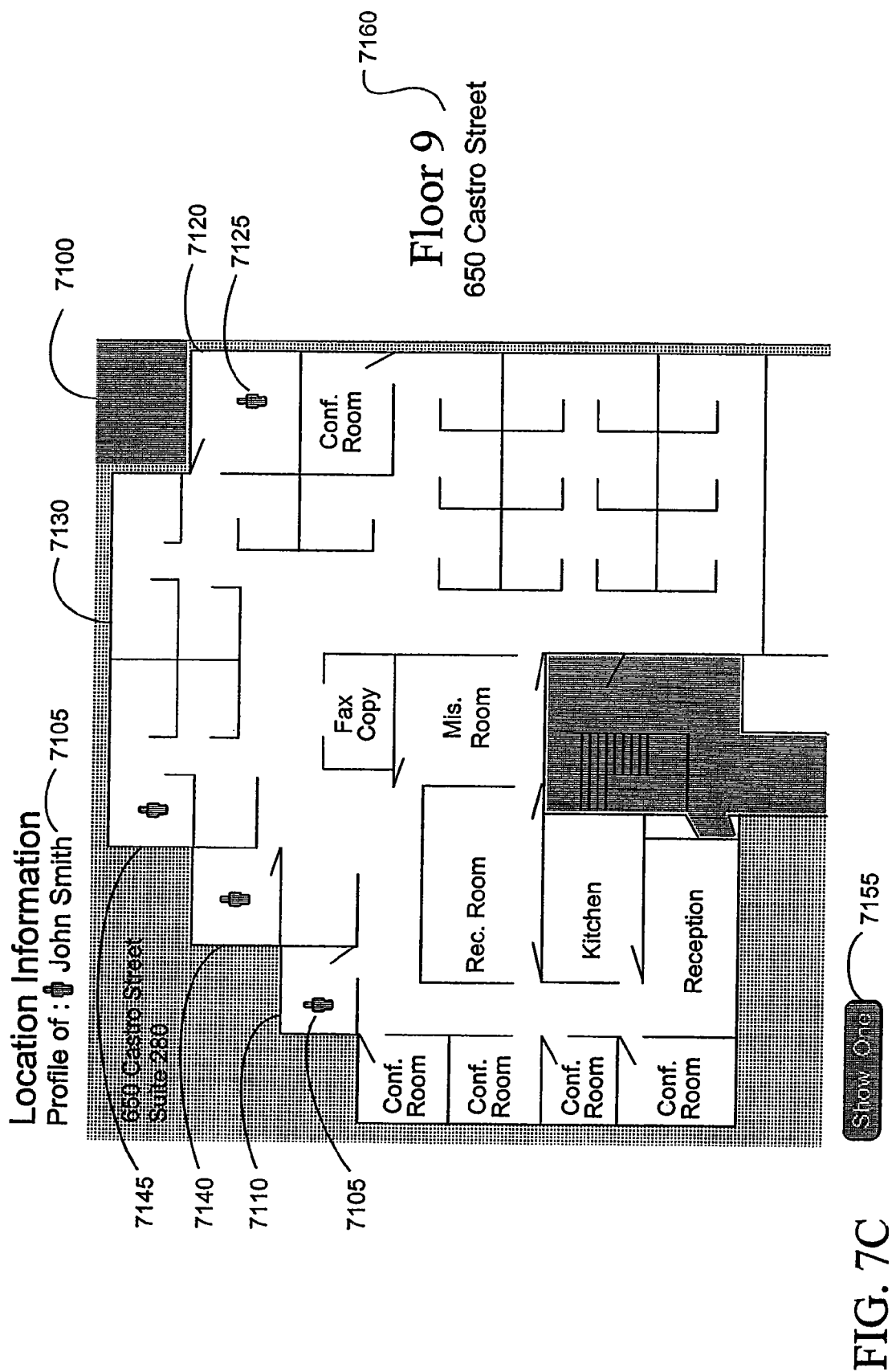

By selecting the Show All button 7150, Map 7100 is updated as illustrated in FIG. 7C to show all employees on the floor displayed by Map 7100. As a result, it becomes apparent that office 7120 is occupied by employee 7125, and that office 7140 and office 7145 are also occupied. In one embodiment, moving a cursor over any of the offices or figures (such as the figures designating John Smith 7105 or employee 7125) provides information about who utilizes the office in question. Thus, John Smith 7105 now understands that to avoid moving someone out of an office, he must request a move to office 7130 rather than office 7120, or not request a move at all. If John Smith 7105 only wishes to see where he sits, he may return to the map displayed as in FIG. 7B by selecting the Show One button 7155.

Figure 7D:
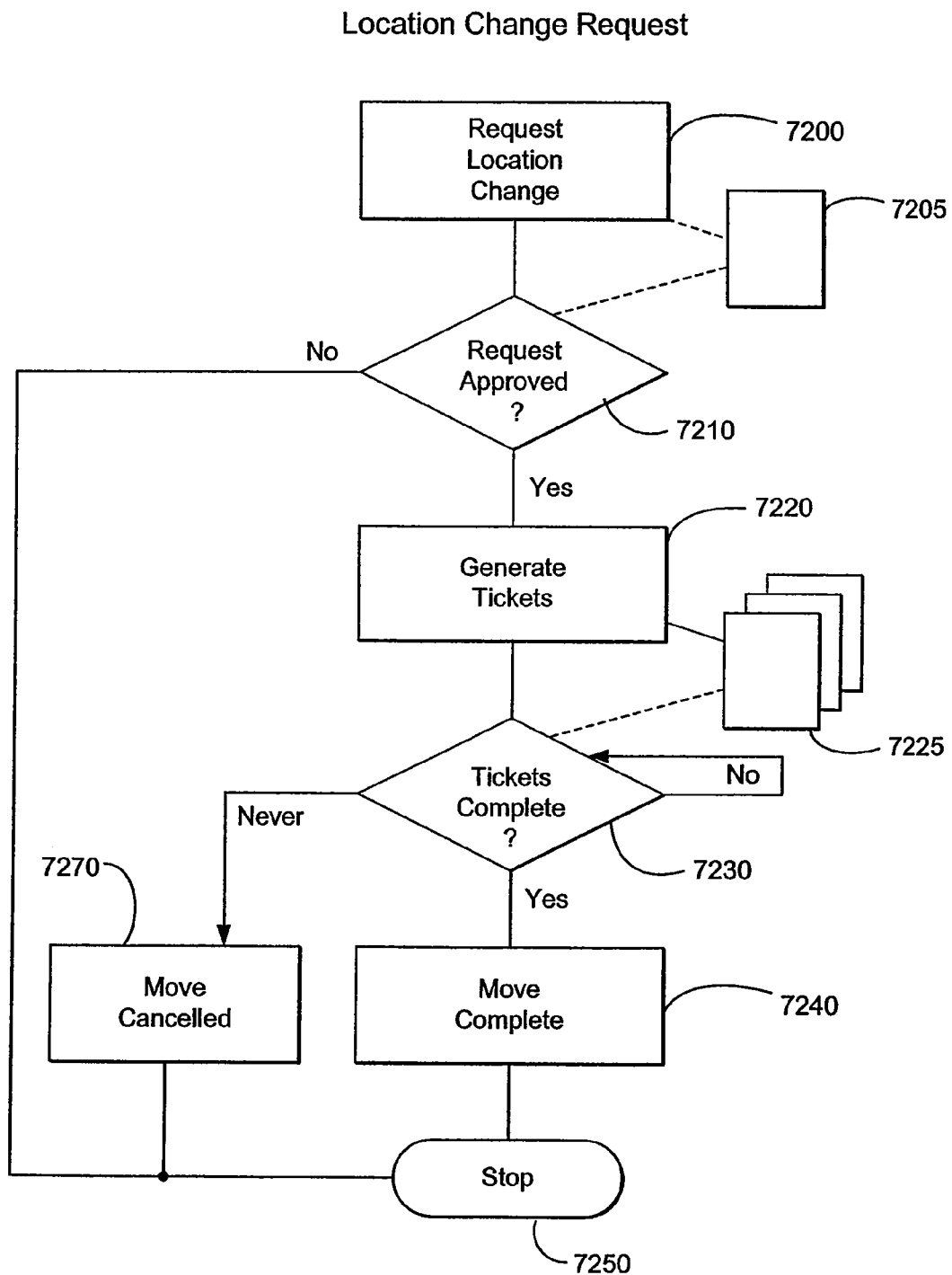
FIG. 7D illustrates one embodiment of a process for changing a location of an employee.

Should John Smith 7105 choose to request a location change, he sets in motion the process illustrated in FIG. 7D in one embodiment. In one embodiment, John Smith 7105 may request a location change by selecting the figure corresponding to his location and dragging it to his desired new location, such as office 7130. This triggers Location Change Request 7200, which causes generation of a location change request ticket 7205. If the request ticket 7205 is denied, for instance if John Smith 7105 requested occupied office 7120, the process ends at stop 7250. If the request ticket 7205 is approved at approval 7210, the process goes to Generate Tickets 7220 and generates location change tickets 7225. Location change tickets 7225 may correspond to such tasks as arranging for movement of equipment, rerouting phone and network service, and other tasks associated with moving offices. The process then goes to Tickets Complete stage 7230, where the process waits until all tickets are complete. Should it become apparent that the Tickets 7225 will never be completed, the process proceeds to Move Cancellation 7270 and then to Stop 7250. However, if all of the tickets 7225 are completed, the process goes to Move complete stage 7240 and then to Stop 7250 with a successful move accomplished.

Figure 8:
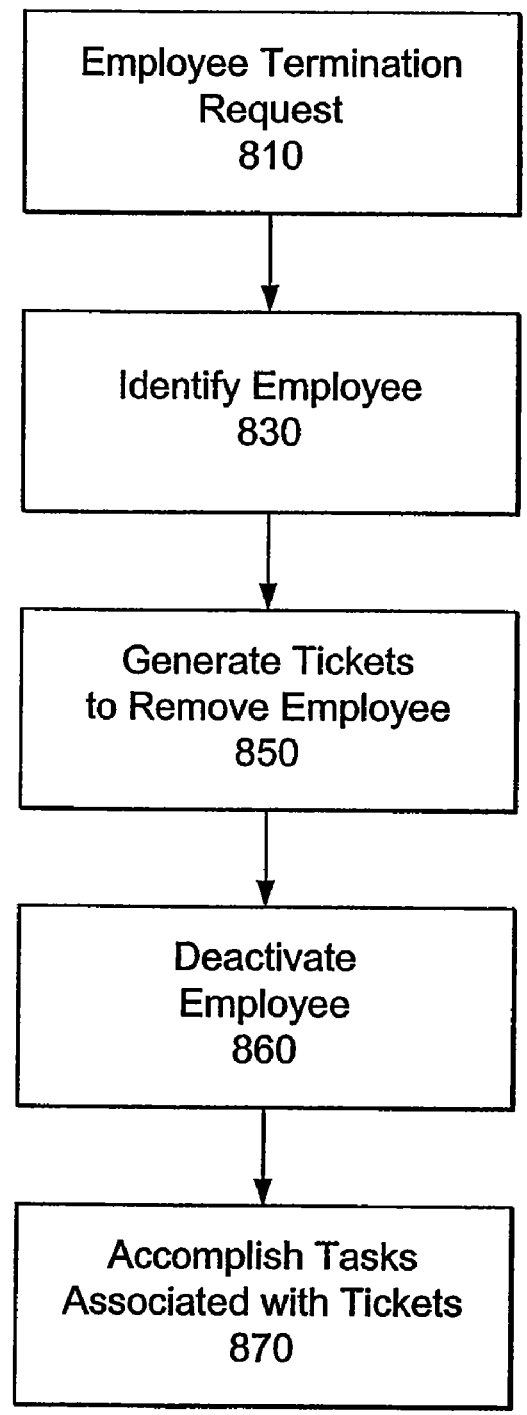
FIG. 8 illustrates one embodiment of how an employee is terminated from a company.

Turning to FIG. 8, one embodiment of how an employee is terminated from a company is illustrated. Employee Termination Request 810 starts the process. Identification 830 involves determining who the employee is. Based on this identification, tickets are generated to remove the employee at Ticket Generation 850. Ticket Generation 850 may, in one embodiment, include use of a template chosen based on the employee's position in the company. For instance, if all engineers have dial-up access to the company computers, and the employee is an engineer, the template for engineers may specify terminating such dialup access. Likewise, if the employee is a manager, this may require confiscating a cell phone. Furthermore, some actions may be necessary for all employees, such that they need not be specified in a template. These actions may include terminating voicemail, parking privileges, and access to the building. Ticket Generation 850 results in tickets being generated for each action necessary to disassociate the employee from the company, and may include a specific date and time for such actions to occur. Following Ticket Generation 850, Deactivation 860 may occur, which may be associated with some of the tasks corresponding to the tickets generated in Ticket Generation 850 or may be a separate, automated process involving removal of the employee from accessibility as an employee in the directory. Finally, the associated tasks are accomplished at Task Accomplishment 870.

Figure 9:
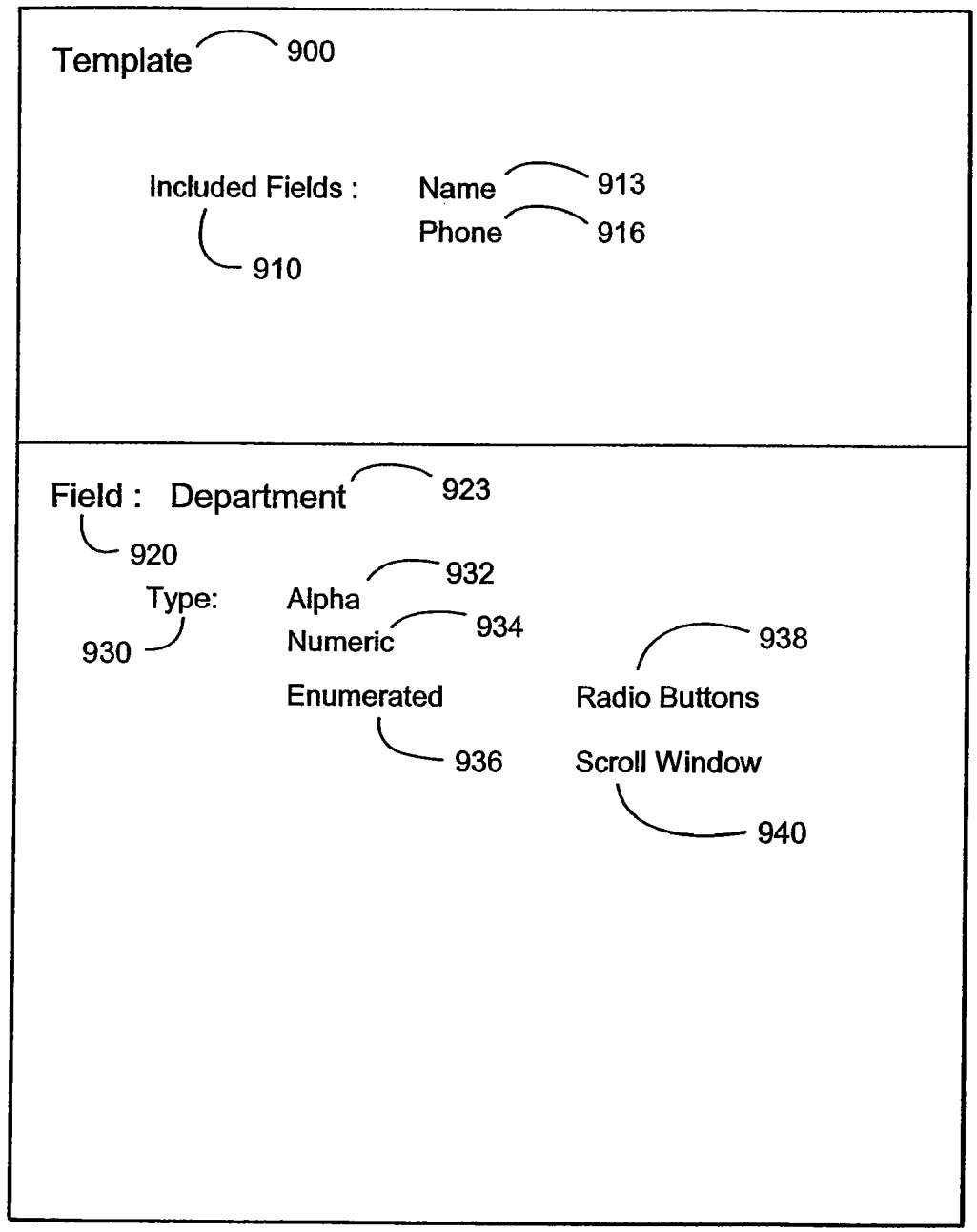
FIG. 9 illustrates one embodiment of a template during formation.

Turning to FIG. 9, one embodiment of a template during formation is illustrated. Template 900 includes Included Fields 910 such as Name 913 and Phone 916. Field 920 indicates which field is being contemplated for consideration, in one embodiment Department 923. Type 930 indicates how the field should be displayed and recorded (the display type), and includes Alpha 932, Numeric 934, and Enumerated 936 in one embodiment. Alpha 932 may, in one embodiment, include letters and numbers, whereas Numeric 934 includes only numbers. Enumerated 936 is a field which allows a selection from a predefined set of choices or a dynamically defined set of choices. Radio Buttons 938 and Scroll Window 940 are options for displaying choices for Enumerated 936. In the case of dynamically defined choices, the template would indicate where to find the list of choices, such as all of the Building entries in the directory server, or all Departments with entries in the directory server. It will be appreciated that implementing the display types in a more elastic or flexible manner, such that 'Cal' or 'Calif' will be converted to 'CA' as mentioned earlier requires further information, that may be supplied in the template building process. Furthermore, it will be appreciated that the information displayed may be translated from the information accessible by the directory server, such that a data item may store the number '5' to indicate display of the text 'California' for example. Note that these templates may be suitable for determining what actions need to be taken to add or remove an employee, what type of information is displayed to employees in different departments, or what form information takes for each employee in a data entry.

Figure 10A:
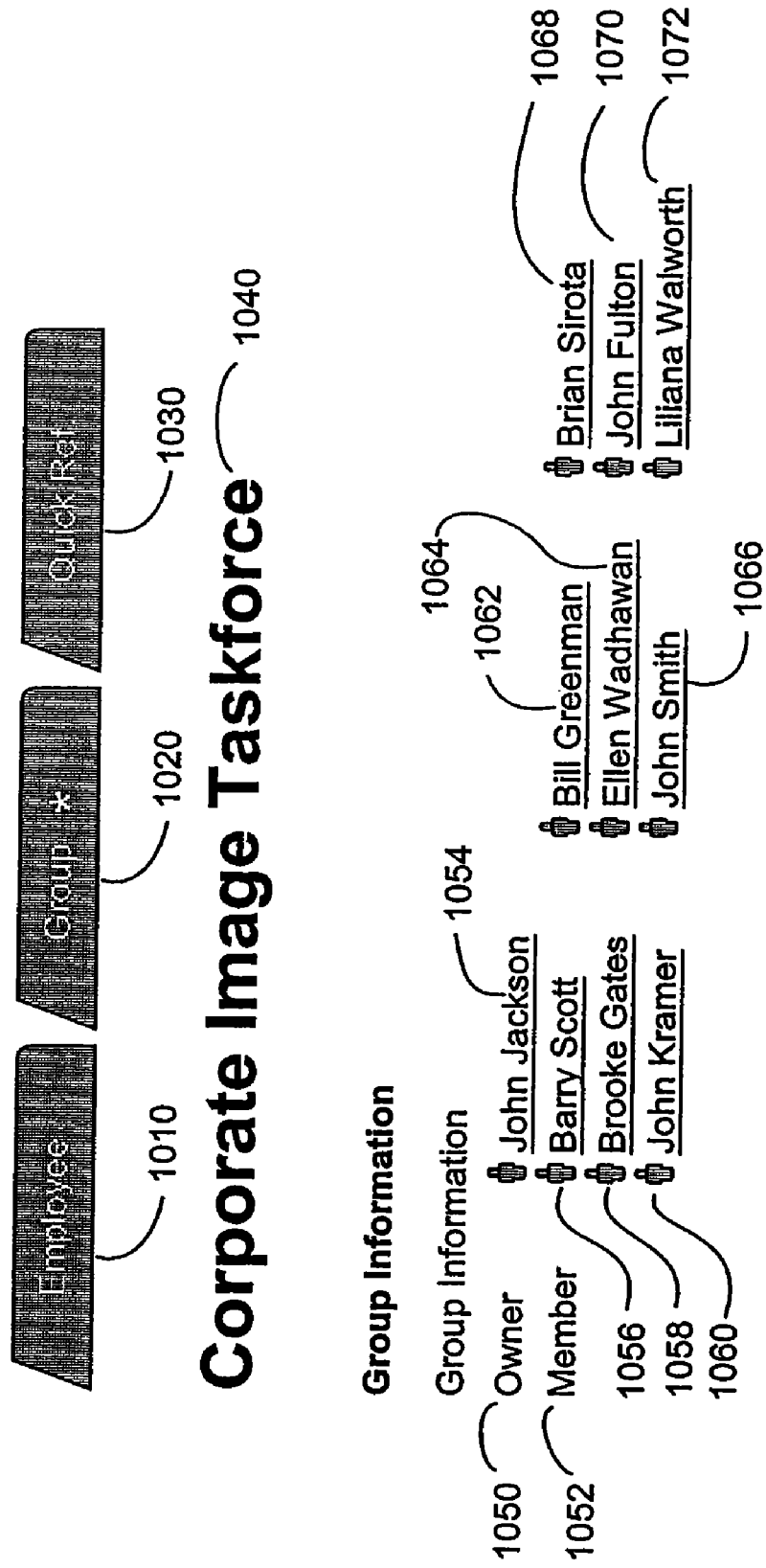
FIGS. 10A and 10B illustrate cross-linkage of selections to manners of display.
Figure 10B:
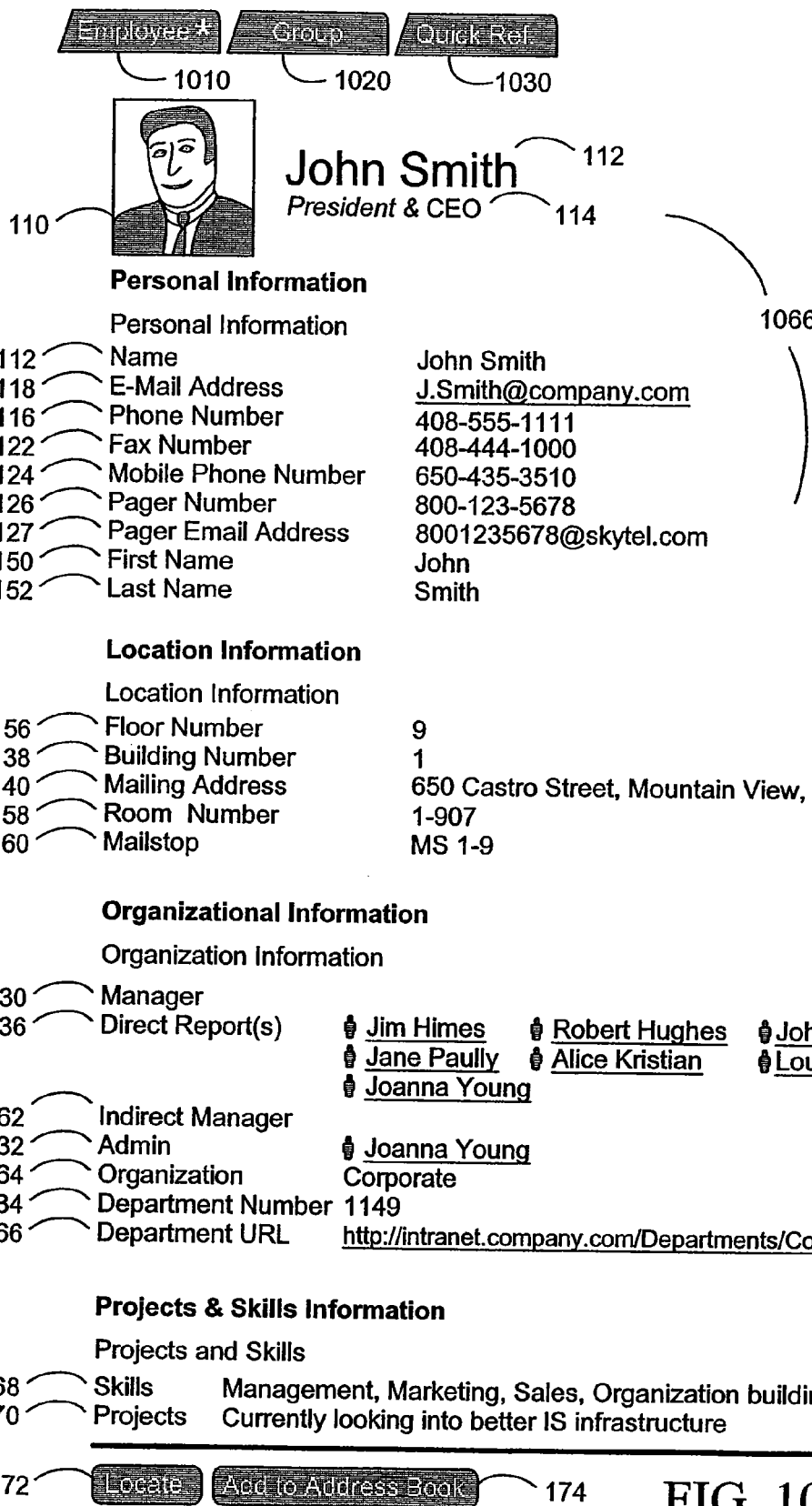

Turning to FIGS. 10A and 10B, the two figures in conjunction illustrate one instance of tab cross-linking. FIG. 10A illustrates a group called the Corporate Image Task Force as illustrated by title 1040. The overall display includes tabs Employee tab 1010, Group tab 1020, and Quick Reference tab 1030. Group tab 1020 is active here, as illustrated by the asterisk, and may be shown to be active in other embodiments by variations in color or highlighting for example. The group has an owner 1050 and members 1052. The owner 1050 of this group is John Jackson 1054, and a unique identifier for his data entry is displayed. The members are Barry Scott 1056, Brooke Gates 1058, John Kramer 1060, Bill Greenman 1062, Ellen Wadhawan 1064, John Smith 1066, Brian Sirota 1068, John Fulton 1070, and Liliana Walworth 1072. Each member has a unique identifier for his or her data entry displayed as well. Upon selecting the unique identifier for John Smith 1066, the display illustrated in FIG. 10B is triggered. As such, the selection of the unique identifier may be referred to as a triggering event.

FIG. 10B illustrates a display of the information associated with John Smith 1066 displayed in a format similar to that of FIG. 1B. At the top of the overall display are still tabs Employee tab 1010, Group tab 1020, and Quick Ref. tab 1030. However, Employee tab 1010 is now active as indicated by the asterisk. The display of FIG. 10A was a group and therefore fell under the Group tab 1020, and was organized as a data entry for a group. However, the data entry for John Smith 1066 is for an employee, so the display switches to the Employee tab 1010 to display the information accessible with the unique identifier for John Smith 1066. It will be appreciated that the display of the unique identifier for John Smith 1066 in FIG. 10A may be considered a first manner of display, and the display of the information associated with the unique identifier for John Smith 1066 in FIG. 10B may be considered a second manner of display. Also, groups, in one embodiment, are separate data entries accessible by the directory server which contain a list of unique identifiers corresponding to the members of the group. Thus, determining which groups a person belongs to may be accomplished in a manner similar to determining Direct Reports 136, namely by querying the directory server to determine which groups a person associated with a particular unique identifier belongs to. This process may be referred to as back-calculation or reverse-calculation, and the groups John Smith 1066 belongs to may be thought of as a derived attribute of John Smith 1066.

Figure 11B:
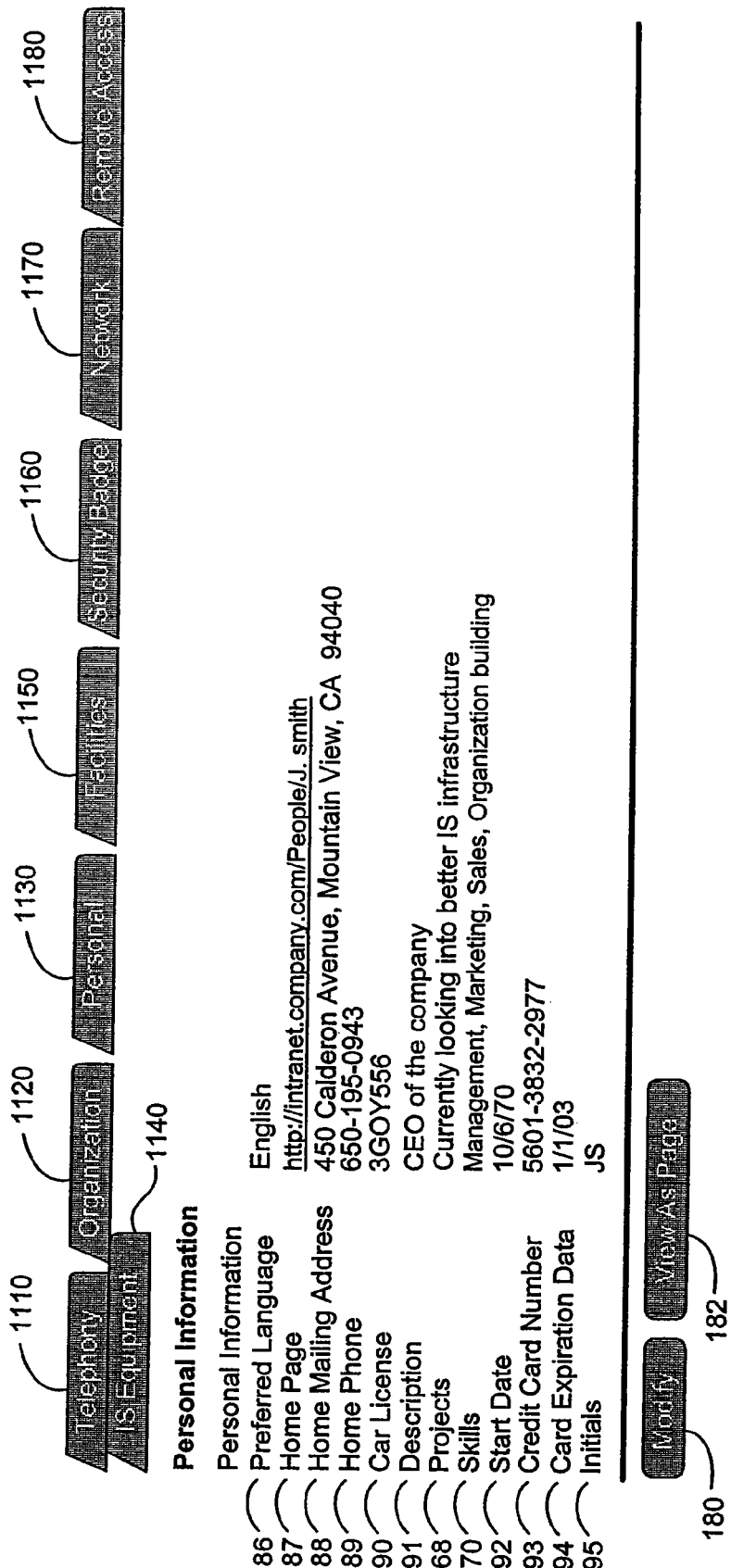
Figure 11C:
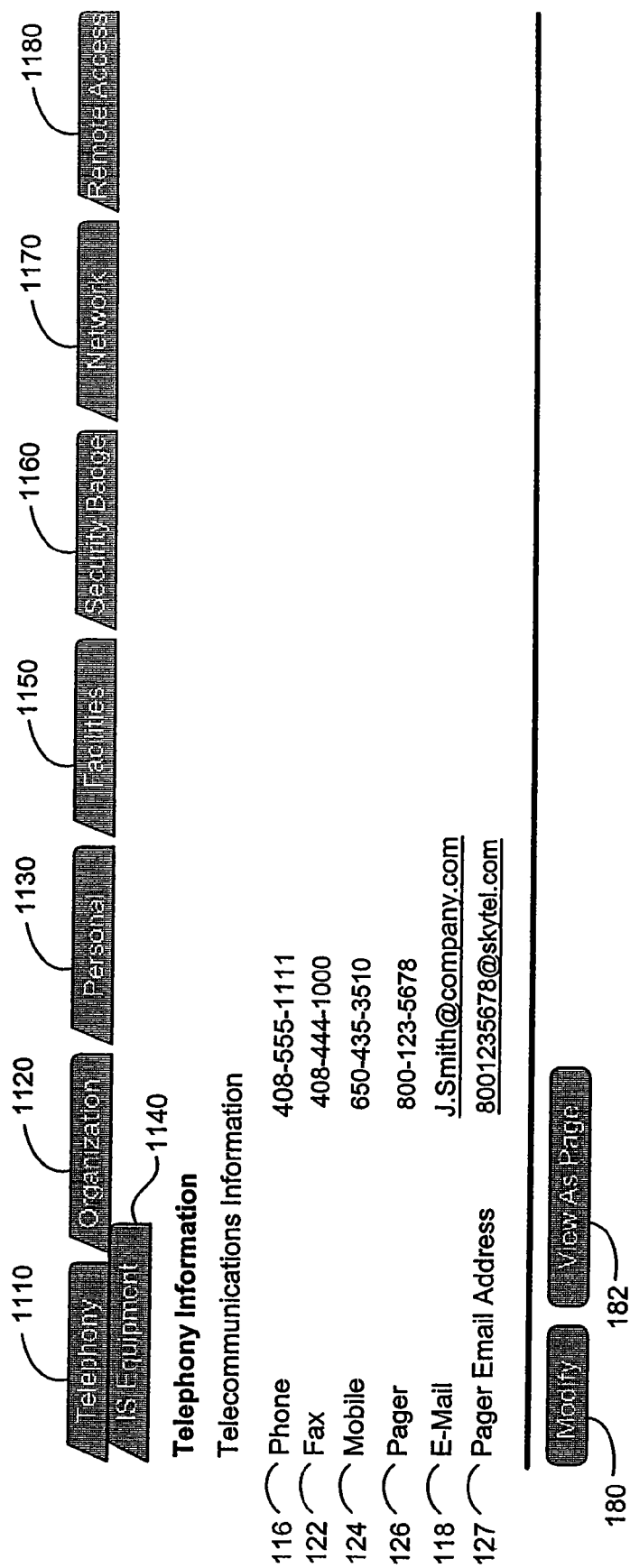

Turning to FIGS. 11A-11C, information associated with John Smith 1066 is illustrated. FIG. 11A shows how information associated with John Smith 1066 may appear to a user such as Gordon Lee 3162. Since Gordon Lee 3162 does not have authority to access all of the information about John Smith 1066, some fields are shown as 'Not Displayed'. These fields include Employee Grade Level 180, Employee Number 182, Home Mailing Address 148, Home Phone 146, Car License 190, Start Date 192, Credit Card Number 193, and Card Expiration Date 194. All of this information may be considered personal or sensitive, and would therefore not be available to all users of the system. Note that some information such as Initials 195, Description 191, Preferred Language 186, Home Page 187, and Type 180 are available.

In contrast, FIG. 11B displays the information associated with John. Smith 1066 for the Personal 1130 tab, as viewed by someone with authority to access sensitive information about John Smith 1066. Such a person may be a human resources person, John Smith 1066's Admin 132, or a Manager 130 of John Smith 1066 if such a person exists. In this instance, Home Mailing Address 148, Home Phone 146, Car License 190, Start Date 192, Credit Card Number 193, and Card Expiration Date 194 are all displayed.

Furthermore, FIG. 11C illustrates the information displayed in conjunction with the Telephony 1110 tab for John Smith 1066 in either the case of access by Gordon Lee 3162 or by someone with authorization to access all information on John Smith 1066. As will be appreciated, this is information useful to the business organization, and therefore may be accessed by anyone.

Access control to information, for both viewing and modification purposes, may be implemented in a highly flexible manner in one embodiment. Reference to FIGS. 3B-3F may prove useful in the following discussion. For example, accesses by Gordon Lee 3162 may be controlled by restrictions implemented by Michael Krone 3152, since Gordon Lee 3162 reports to Michael Krone 3152. Likewise, a person or people may be designated as having responsibility for implementing access control restrictions for an organization or subpart of that organization. Thus, a person such as Don O'Nakamura 3160 may be designated to implement access controls for all people reporting to Michael Krone 3152. Furthermore, access control may be implemented at various levels within an organization, such that John Jackson 3120 may implement access control or designate someone to implement access control for his organization. Such access controls may be cumulative, such that only the set of information that is accessible under both control regimes may be accessed by Gordon Lee 3162, or one control regime may be given priority, such as the control regime for the smallest organization Gordon Lee 3162 belongs to or the control regime for the largest organization. Thus, the first control regime may override the second control regime, or vice versa, or the two control regimes may complement each other.

Likewise, access control may be as granular as necessary, such that in one embodiment access may be granted to sets of data entries or single data entries on an attribute by attribute basis. Furthermore, in one embodiment, access control may be determined by rules in the form of queries, similar to the queries of FIGS. 5A and 5B above. Thus, a query may be formed such as Manager='Lou Reed', and those employees reporting to Lou Reed 3108 (the CIO) may have access to all information. Additionally, access control may be separated such that most employees have access for viewing but not for requesting changes, or for viewing and requesting but not approving changes. A first employee may be able to view information about John Smith 1066, whereas a second employee may be able to view and request changes of information about John Smith 1066 and a third employee may be able to approve such changes.

Figure 12:
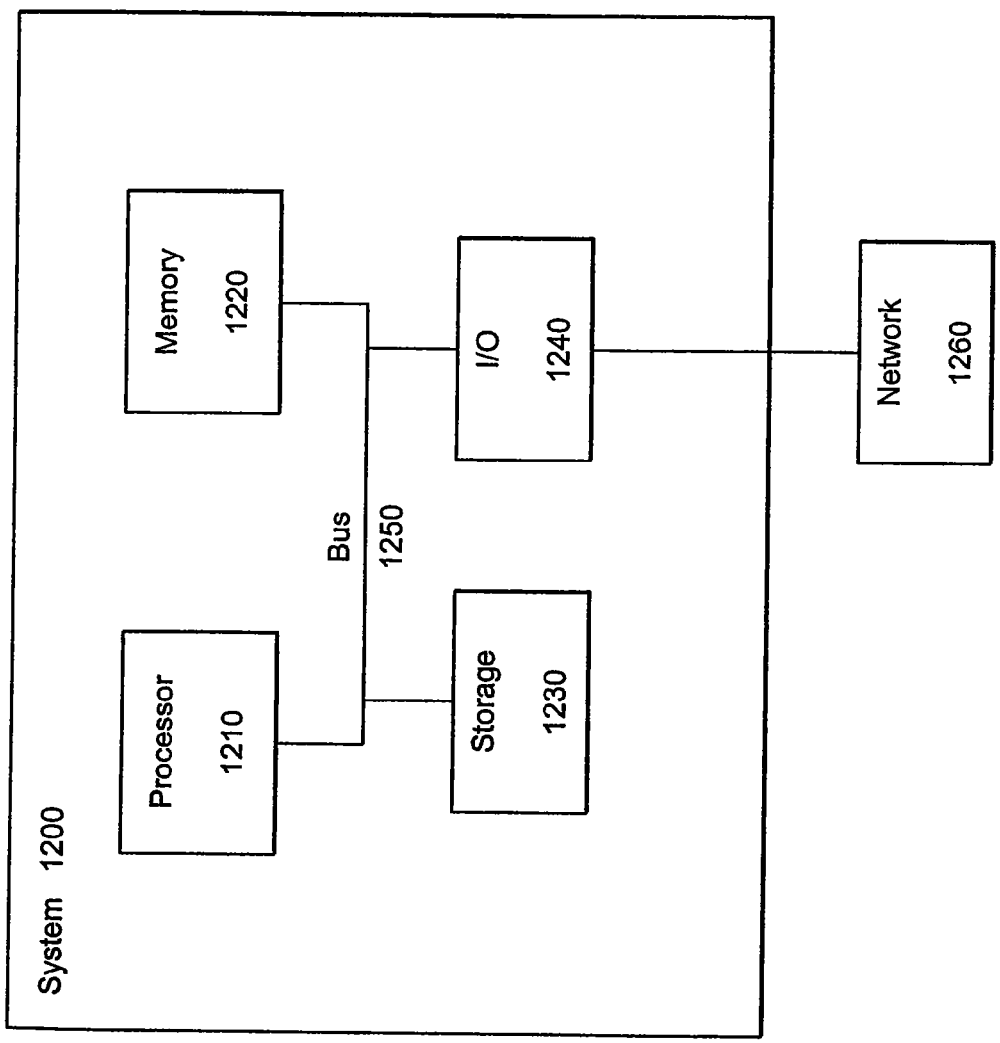
FIG. 12 illustrates one embodiment of a system suitable for use in conjunction with the method and apparatus of the invention.

As will be apparent to one skilled in the art, the apparatus and methods discussed can be implemented in a variety of systems, subsystems, or other apparatus. One such system is illustrated in FIG. 12. The system illustrated, System 1200, includes Processor 1210, Memory 1220, Storage 1230, Input/Output (I/O) 1240 and Bus 1250. Processor 1210 executes instructions, thereby controlling to some degree each of the other components. Memory 1220 may include static and dynamic elements, and may be composed of RAM, ROM, or other forms of memory known to those skilled in the art. Storage 1230 may likewise be composed of RAM or ROM, and can be composed of other machine-readable media, including but not limited to magnetic or optical disks, magnetic tapes, carrier waves, and the like. I/O 1240 can be any number of components capable of supplying data to a processor, including but not limited to keyboards, videocameras, scanners, touch-sensitive screens, microphones, machine-readable media input devices, carrier-wave input devices, and the like. Likewise, I/O 1240 may be any number of components capable of receiving data from a processor for transmission outside the system, including but not limited to screens or displays, printers, speakers, machine-readable media output devices, carrier-wave output devices, and the like. Network 1260 can be a local connection to an office network, the Internet, a telephone network, or any other possible network connection, many of which will be apparent to those skilled in the art. Bus 1250, while shown here as interconnecting all components, can connect only Processor 1210 to each component, can restrict the flow of information to only one direction, but generally allows flow of information between components. Network 1260 is shown here connected to I/O 1240, but it will be appreciated by those skilled in the art that other methods of connecting Network 1260 to either System 1200 or Processor 1210 can be achieved consistent with the system as otherwise described.

It will be appreciated by those skilled in the art that Computer System 1200 may be composed of only some of the illustrated components and still function, and that innumerable arrangements of these components, along with other components not illustrated, will still perform the same functions as Computer System 1200 in the same way, with the same result. In particular though, Computer System 1200 may be configured or programmed to carry out the methods of implementing and maintaining a corporate directory and service center as illustrated in the foregoing figures and description. Moreover, in some embodiments at least two systems would be utilized, one of which would serve as a directory server and be utilized to access the information and the other of which would be used to receive input from the user, act on that input to find triggering events or requests, query the directory server, organize results of queries and display results of queries. In such an embodiment, the directory server may be configured to store information in a persistent manner, such that the storage is persistent, or appears non-volatile, due to equipment such as backup power supplies and due to regular data backups.

It will be apparent that the various embodiments of the invention above may be implemented in the form of machine-readable instructions suitable for execution by some form of a processor such as a microprocessor or digital signal processor. These machine-readable instructions may be embodied in a machine-readable medium such as a magnetic or optical disk, carrier wave, optically recognizable text, or other media and non-volatile storage, and may be embodied in a single piece of a medium, multiple pieces of a medium, or multiple media. Likewise, hardware can be implemented to perform according to the teachings of the above embodiments, and such hardware may include but not be limited to integrated circuits.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of searching a plurality of data entries, each data entry having a plurality of attributes comprising:
   providing a common characteristic;
   accessing the plurality of data entries using lightweight directory access protocol ("LDAP");
   searching the plurality of data entries for the common characteristic; and
   organizing the data entries which have the common characteristic of the plurality of data entries.

2. A method of managing a plurality of data entries, comprising:
   receiving, at a computer, a first request for a change in a data entry of said plurality of data entries;
   accessing said data entry using lightweight directory access protocol ("LDAP");
   automatically generating, at the computer, a set of tickets in response to said first request, said tickets include tasks that are prerequisites to completing said change in said data entry; and
   monitoring status of said tasks.

3. A method according to claim 2, wherein:
   said tickets indicate an associated task to be accomplished and an entity which needs to accomplish said associated task.

4. A method according to claim 2, wherein:
   said set of tickets includes a first ticket and a second ticket dependent on said first ticket.

5. A method according to claim 2, wherein:
   said tickets indicate a service, a create date, a due date, comments, identification and status.

6. A method according to claim 2, wherein:
   said tickets include unique identifiers.

7. A method according to claim 2, wherein:
   said set of tickets includes a first ticket owned by a first entity and a second ticket owned by a second entity.

8. A method according to claim 2, wherein:
   said change in said data entry includes adding said data entry to said plurality of data entries.

9. A method according to claim 2, wherein:
   said change in said data entry includes modifying said data entry.

10. A method according to claim 2, wherein:
    said plurality of data entries store information about organizational resources; and
    said change in said data entry includes adding, modifying or deleting information about a particular organizational resource.

11. A method according to claim 2, wherein:
    said plurality of data entries include information in a directory.

12. A method according to claim 2, further comprising:
    completing fulfillment of said first request when said tasks have been completed.

13. A method according to claim 2, wherein:
    said tasks do not include said change in said data entry.

14. A method according to claim 2, wherein:
    said tasks are assigned to be performed by one or more entities other than an entity making said change in said data entry.

15. A method according to claim 2, wherein:
    said tasks are assigned to be performed by different entities.

16. A method according to claim 2, wherein:
    said plurality of data entries store information about organizational resources; and
    said first request is to add a new person to said information about organizational resources.

17. A method according to claim 16, wherein:
    said tasks include entering information about said new person.

18. A method according to claim 16, wherein:
    said tasks include notification tasks.

19. A method according to claim 16, wherein:
    one of said tickets requests an approval.

20. A method according to claim 2, wherein:
    one of said tickets requests an approval.

21. A method according to claim 20, further comprising:
    generating one or more additional tickets in response to said approval.

22. A method according to claim 2, wherein:
    one of said tickets requests approval of said change.

23. A method according to claim 2, wherein:
    said tasks are assigned owners; and
    said step of monitoring includes a particular owner accessing a set of task assigned to that particular owner.

24. A method according to claim 2, wherein:
    said tasks are assigned owners; and
    said step of generating includes notifying said owners.

25. A method according to claim 2, wherein:
said tasks are assigned owners;
said step of generating includes notifying said owners by electronic mail.

26. One or more processor readable storage devices having processor readable code embodied on said processor readable storage devices, said processor readable code for programming one or more processors, said processor readable code comprising:
code for automatically generating a set of tickets in response to a first request for a change in a data entry of said plurality of data entries, said tickets include tasks that are prerequisites to completing said change in said data entry;
code for accessing said data entry using lightweight directory access protocol ("LDAP"); and
code for completing fulfillment of said first request when said tasks have been completed.

27. One or more processor readable storage devices according to claim 26, wherein:
said set of tickets includes a first ticket and a second ticket dependent on said first ticket.

28. One or more processor readable storage devices according to claim 26, wherein:
said set of tickets includes a first ticket owned by a first entity and a second ticket owned by a second entity.

29. One or more processor readable storage devices according to claim 26, wherein:
said plurality of data entries store information about organizational resources; and
said change in said data entry includes adding, modifying or deleting information about a particular organizational resource.

30. One or more processor readable storage devices according to claim 26, wherein:
said tasks do not include said change in said data entry.

31. One or more processor readable storage devices according to claim 26, wherein:
said tasks are assigned to be performed by one or more entities other than an entity making said change in said data entry.

32. One or more processor readable storage devices according to claim 26, wherein:
one of said tickets requests an approval.

33. A method of managing a plurality of data entries comprising:
receiving, at a computer, a first request for a change in a data entry of said plurality of data entries;
accessing said data entry using lightweight directory access protocol ("LDAP");
in response to said receiving, automatically generating, at the computer, a set of one or more tasks that do not make said change in said data entry, said tasks are prerequisites to completing said change in said data entry; and
completing fulfillment of said first request when said tasks have been completed.

34. A method according to claim 33, wherein:
said set of tasks includes a first task and a second task dependent on said first task.

35. A method according to claim 33, wherein:
said set of tasks includes a first task owned by a first entity and a second tick et task owned by a second entity.

36. A method according to claim 33, wherein:
said plurality of data entries store information about organizational resources; and
said change in said data entry includes adding, modifying or deleting information about a particular organizational resource.

37. A method according to claim 33, wherein:
said tasks are assigned to be performed by one or more entities other than an entity making said change in said data entry.

38. A method according to claim 33, wherein:
said plurality of data entries store information about organizational resources; and
said first request is to add a new person to said information about organizational resources.

39. A method according to claim 33, wherein:
one of said tasks is to provide an approval.

40. One or more processor readable storage devices having processor readable code embodied on said processor readable storage devices, said processor readable code for programming one or more processors, said processor readable code comprising:
in response to receiving a first request for a change in a data entry of said plurality of data entries, code for generating a set of one or more tasks that do not make said change in said data entry, said tasks are prerequisites to completing said change in said data entry; and
code for accessing said data entry using lightweight directory access protocol ("LDAP");
code for completing fulfillment of said first request when said tasks have been completed.

41. One or more processor readable storage devices according to claim 40, wherein:
said plurality of data entries store information about organizational resources; and
said first request is to add a new person to said information about organizational resources.

42. One or more processor readable storage devices according to claim 40, wherein:
said tasks are assigned to be performed by one or more entities other than an entity making said change in said data entry.

43. One or more processor readable storage devices according to claim 40, wherein:
one of said tasks is to provide an approval.

44. An apparatus for managing a plurality of data entries, comprising:
one or more processors; and
one or more storage devices having processor readable code embodied on said processor readable storage devices, said processor readable code for programming said one or more processors, wherein said processor readable code comprises:
code for receiving a first request for a change in a data entry of said plurality of data entries,
code for accessing said data entry using lightweight directory access protocol ("LDAP"),
in response to said receiving, code for automatically generating a set of one or more tasks that do not make said change in said data entry, said tasks are prerequisites to completing said change in said data entry, and
code for completing fulfillment of said first request when said tasks have been completed.

45. A method of managing a plurality of data entries comprising:
receiving, at a computer, a first request for a change in a data entry of said plurality of data entries;
in response to said receiving, automatically generating, at the computer, a set of one or more tasks that are to be performed as a prerequisite to completing said change in said data entry, said tasks are assigned to be performed by one or more entities other than an entity making said change in said data entry;

accessing said data entry using lightweight directory access protocol ("LDAP"); and monitoring status of said one or more tasks.

46. A method according to claim 45, wherein:

said set of tasks includes a first task and a second task dependent on said first task.

47. A method according to claim 45, wherein:

said set of tasks includes a first task owned by a first entity and a second task owned by a second entity.

48. A method according to claim 45, wherein:

said plurality of data entries store information about organizational resources; and said change in said data entry includes adding, modifying or deleting information about an organizational resource.

49. A method according to claim 45, wherein:

said plurality of data entries store information about organizational resources; and said first request is to add a new person to said information about organizational resources.

50. A method according to claim 45, wherein:

one of said tasks is to provide an approval.

51. One or more processor readable storage devices having processor readable code embodied on said processor readable storage devices, said processor readable code for programming one or more processors, said processor readable code comprising:

in response to receiving a first request for a change in a data entry of the plurality of data entries, code for generating a set of one or more tasks that are a prerequisite to completing said change in said data entry, said tasks are assigned to be performed by one or more entities other than an entity making said change in said data entry;

code for accessing said data entry using lightweight directory access protocol ("LDAP"); and code for completing said change subsequent to performing said tasks.

52. One or more processor readable storage devices according to claim 51, wherein:

said set of tasks includes a first task and a second task dependent on said first task.

53. One or more processor readable storage devices according to claim 51, wherein:

said plurality of data entries store information about organizational resources; and said first request is to add a new person to said information about organizational resources.

54. An apparatus for managing a plurality of data entries, comprising:

one or more processors; and one or more storage devices having processor readable code embodied on said processor readable storage devices, said processor readable code for programming said one or more processors, wherein said processor readable code comprises:

code for receiving a first request for a change in a data entry of a plurality of data entries, code for accessing said data entry using lightweight directory access protocol ("LDAP"), in response to said first request, code for generating a set of one or more tasks that are to be performed as a prerequisite to completing said change in said data entry, said tasks are assigned to be performed by one or more entities other than an entity making said change in said data entry, code for monitoring status of said one or more tasks, and code for completing said change in said data entry.

\* \* \* \* \*

UNITED STATES PATENT AND TRADEMARK OFFICE
CERTIFICATE OF CORRECTION

| | | |
|---|---|---|
| PATENT NO. | : 7,979,433 B2 | Page 1 of 1 |
| APPLICATION NO. | : 12/034784 | |
| DATED | : July 12, 2011 | |
| INVENTOR(S) | : Vora et al. | |

It is certified that error appears in the above-identified patent and that said Letters Patent is hereby corrected as shown below:

On sheet 9 of 45 in figure 3D, Box 3124, line 2, delete "Manufactu" and insert -- Manufacturing --, therefor.

On sheet 9 of 45, in figure 3D, Box 3138, line 2, delete "Manufactu" and insert -- Manufacturing --, therefor.

On sheet 42 of 45, in figure 11A, Reference Numeral 194, line 1, delete "Data" and insert -- Date --, therefor.

On sheet 43 of 45, in figure 11B, Reference Numeral 194, line 1, Delete "Data" and insert -- Date --, therefor.

In column 1, line 16, after "which" insert -- is --.

In column 1, line 17, delete "TO" and insert -- to --, therefor.

In column 10, line 38, delete "FIG. 38-3F," and insert -- FIGS. 3B-3F, --, therefor.

In column 13, line 10, delete "in is" and insert -- is --, therefor.

In column 17, line 57, after "Requestor" insert -- = --.

In column 21, line 45, delete "John." and insert -- John --, therefor.

In column 25, line 64, in Claim 35, delete "second tick task et" and insert -- second task --, therefor.

Signed and Sealed this
Fifteenth Day of November, 2011

David J. Kappos
*Director of the United States Patent and Trademark Office*